May 20, 1941.　　A. KINGSBURY ET AL　　2,243,009
ROLLING MILL AND BEARING THEREFOR
Filed Jan. 26, 1934　　14 Sheets-Sheet 8
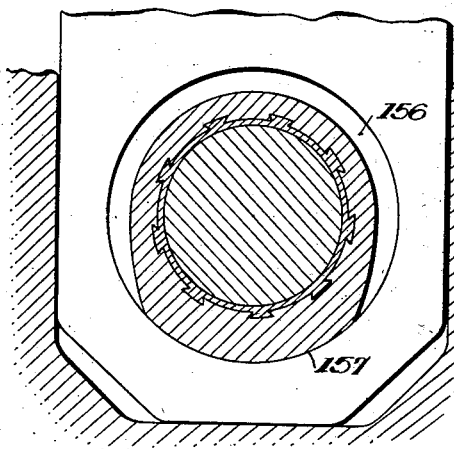
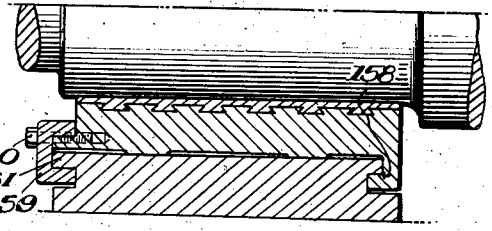
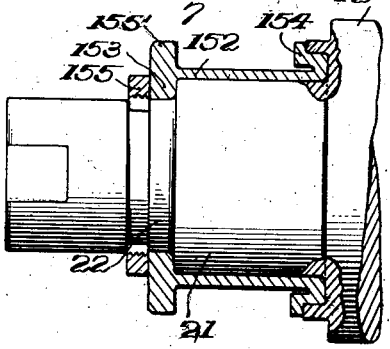
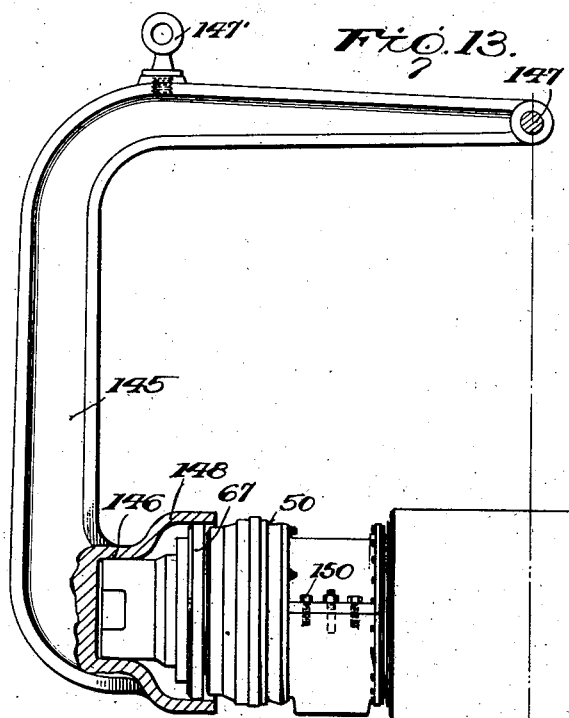
Inventors
Albert Kingsbury
Harry A. S. Howarth
By Cameron, Kerkam & Sutton
Attorneys

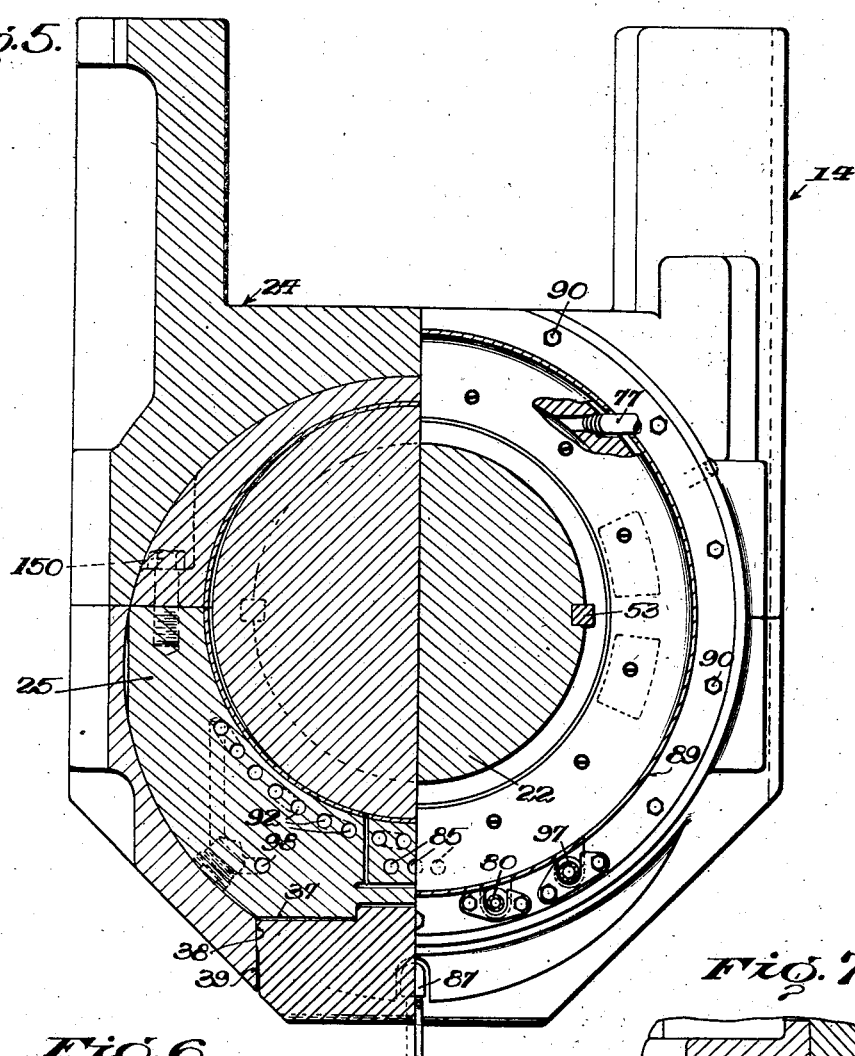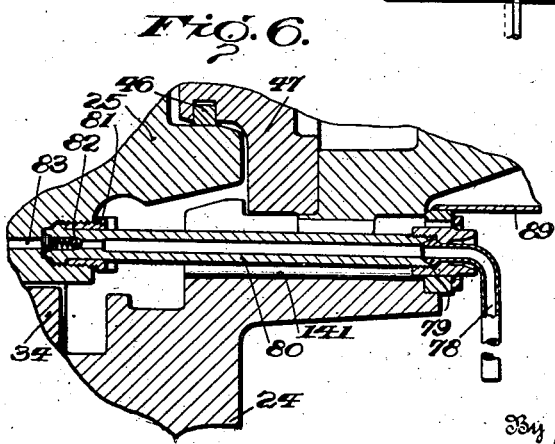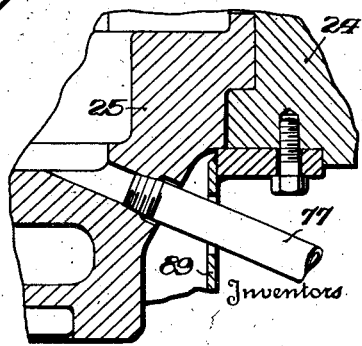

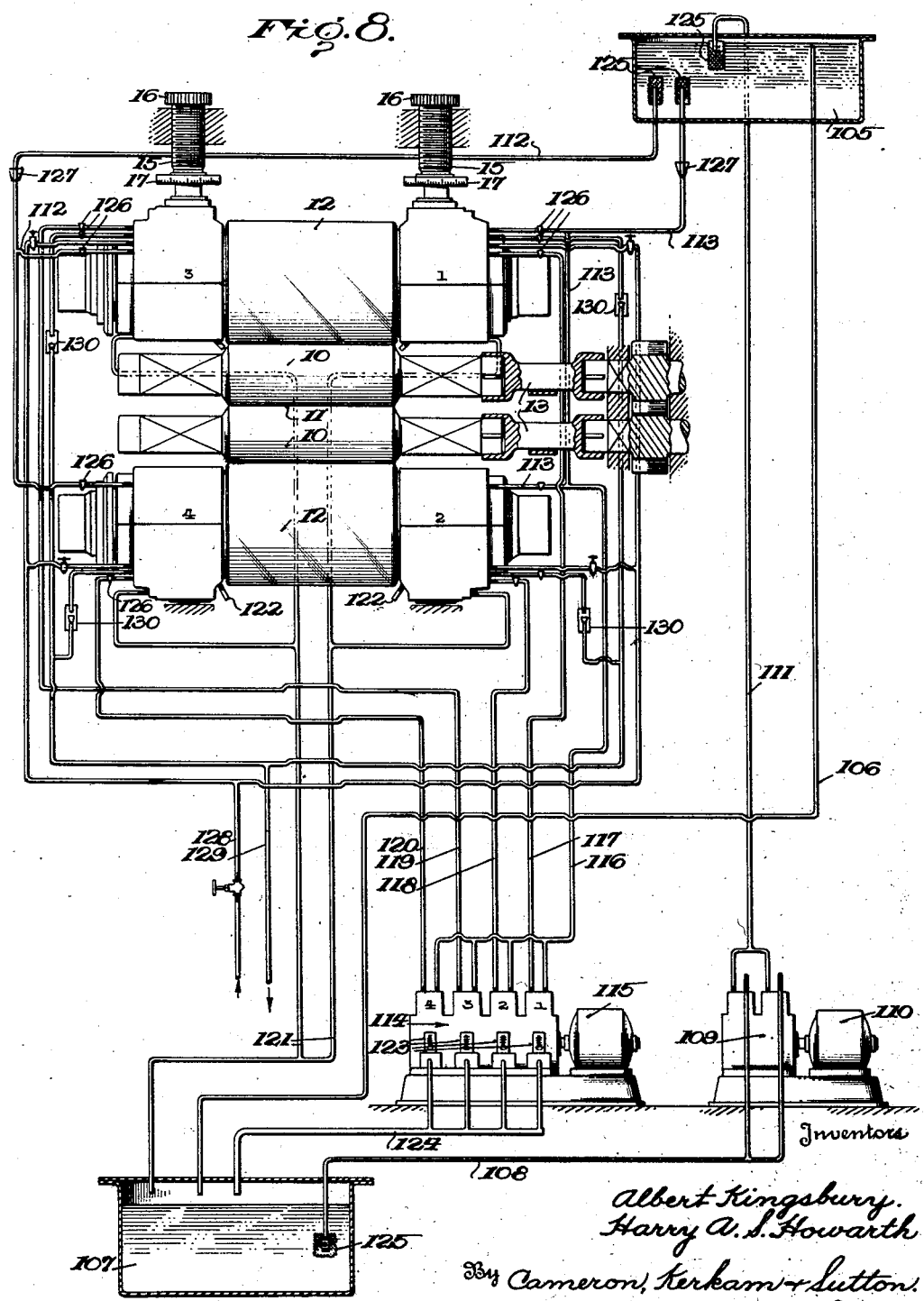

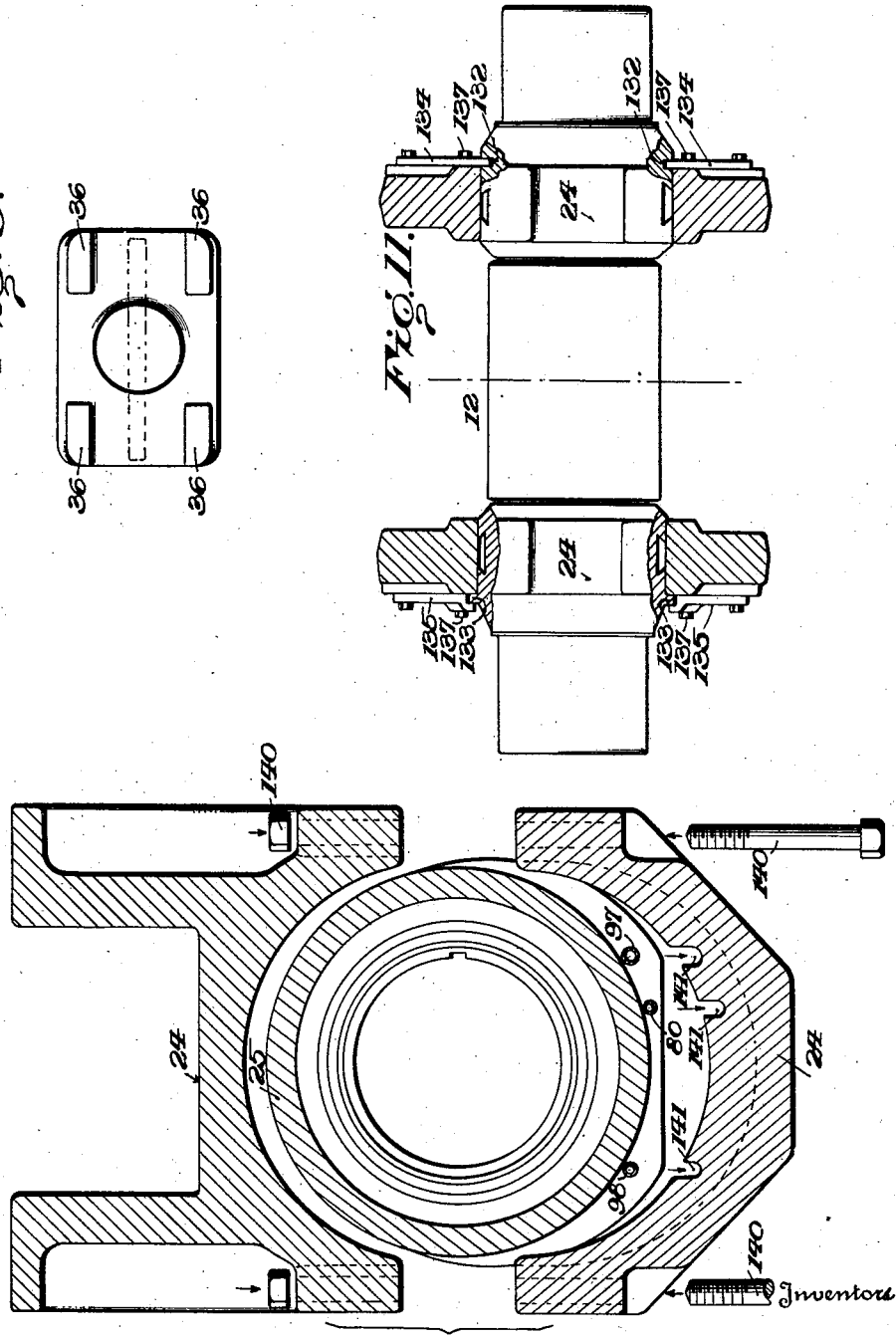

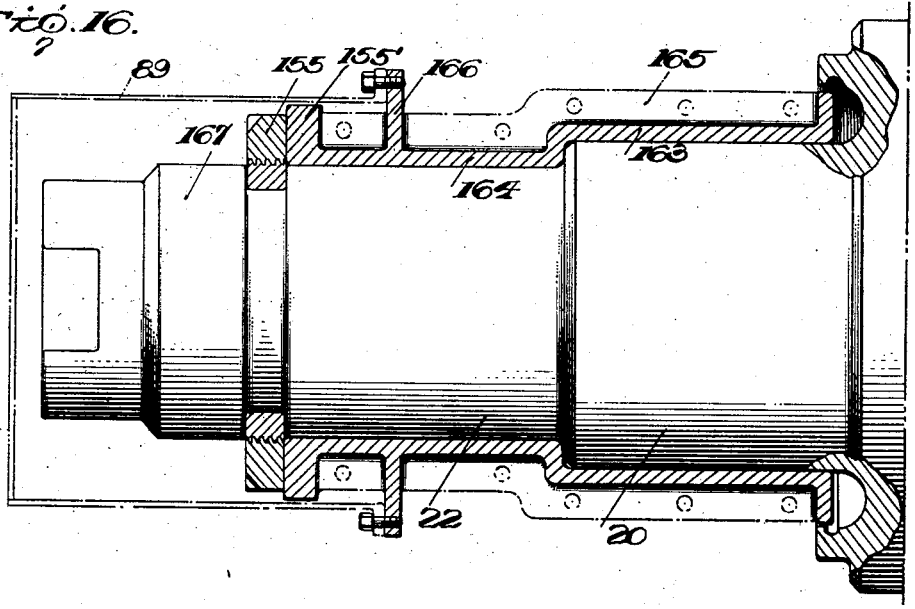
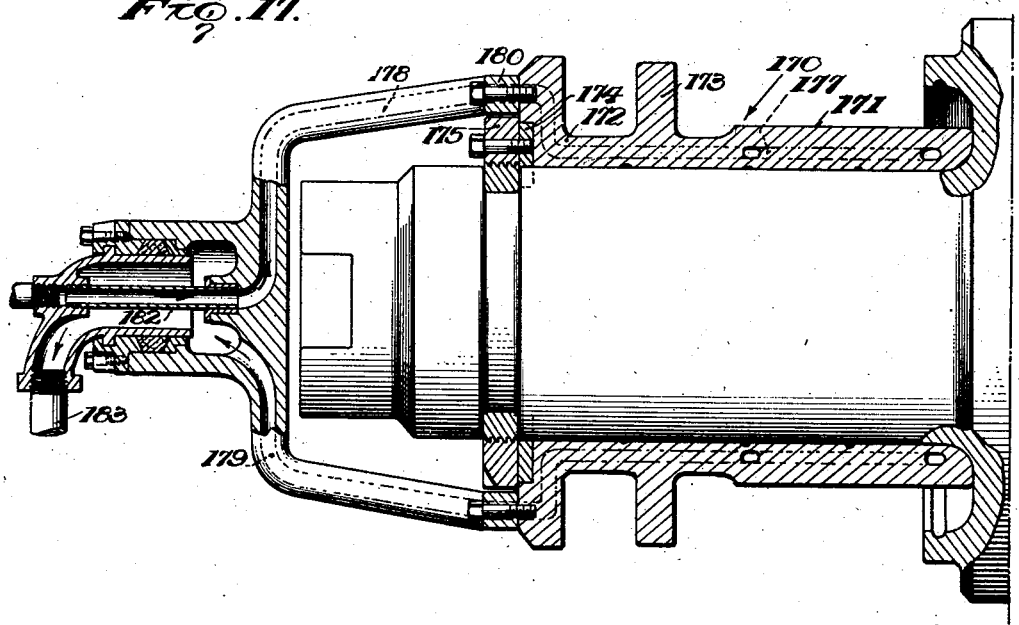

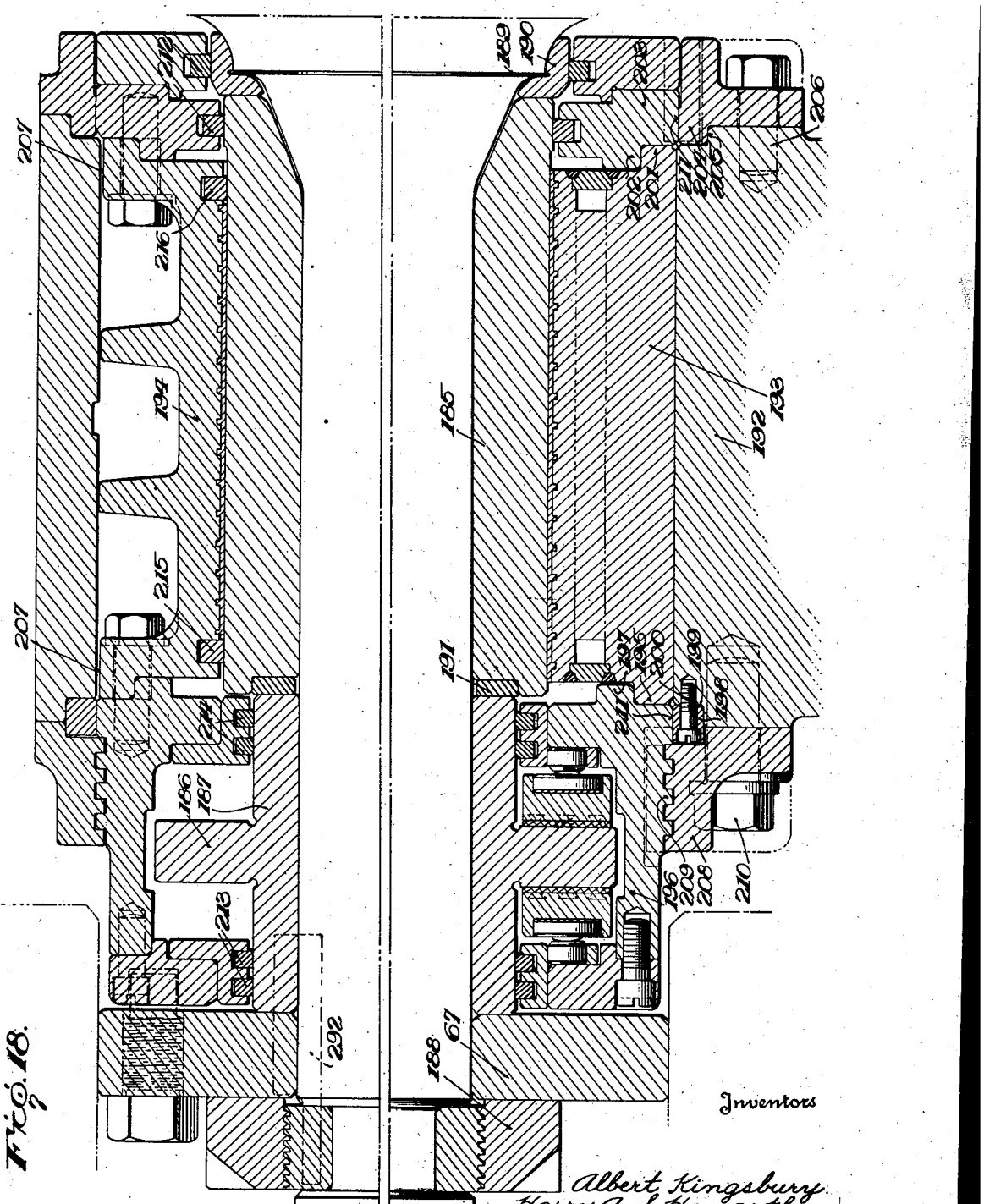

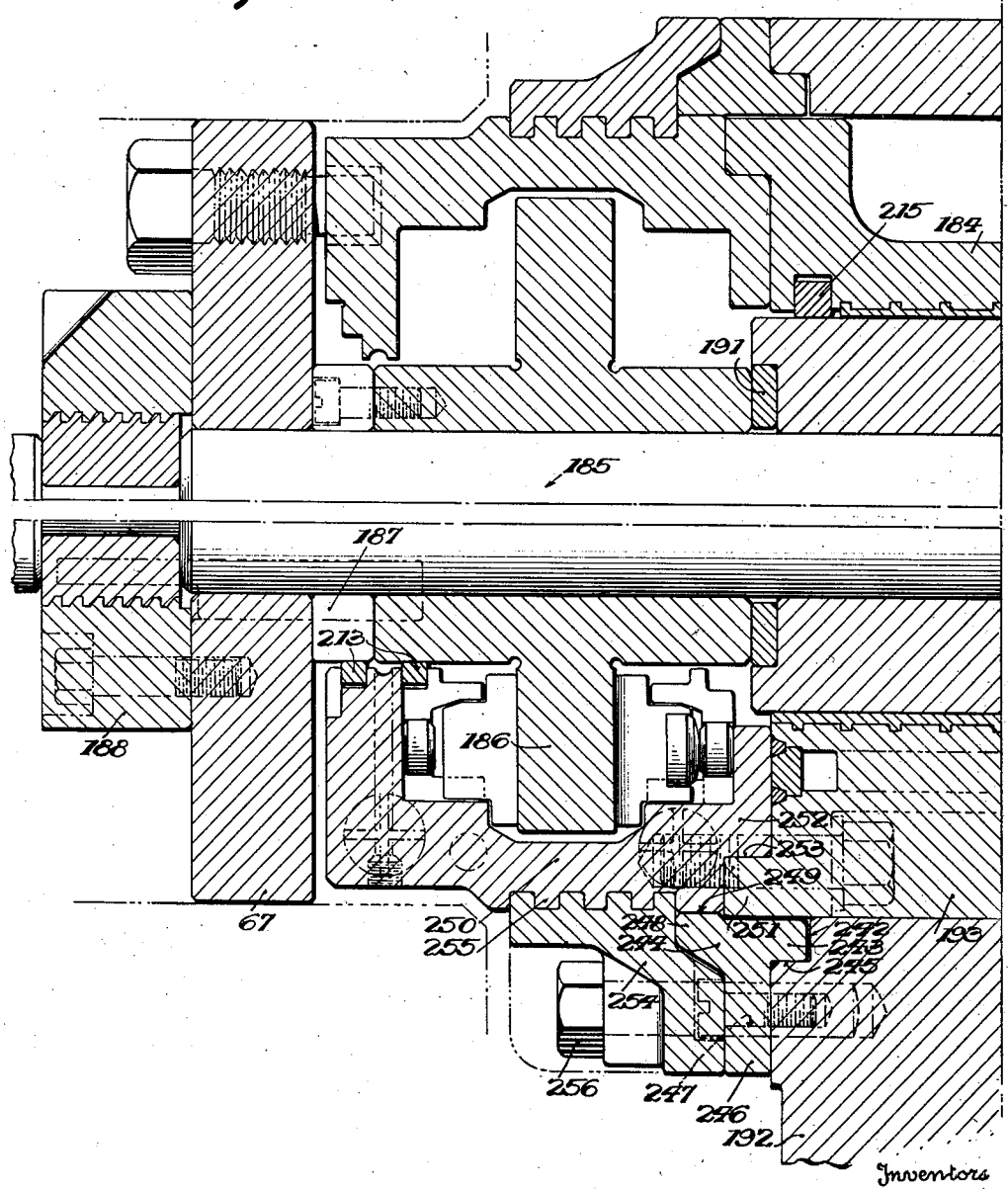

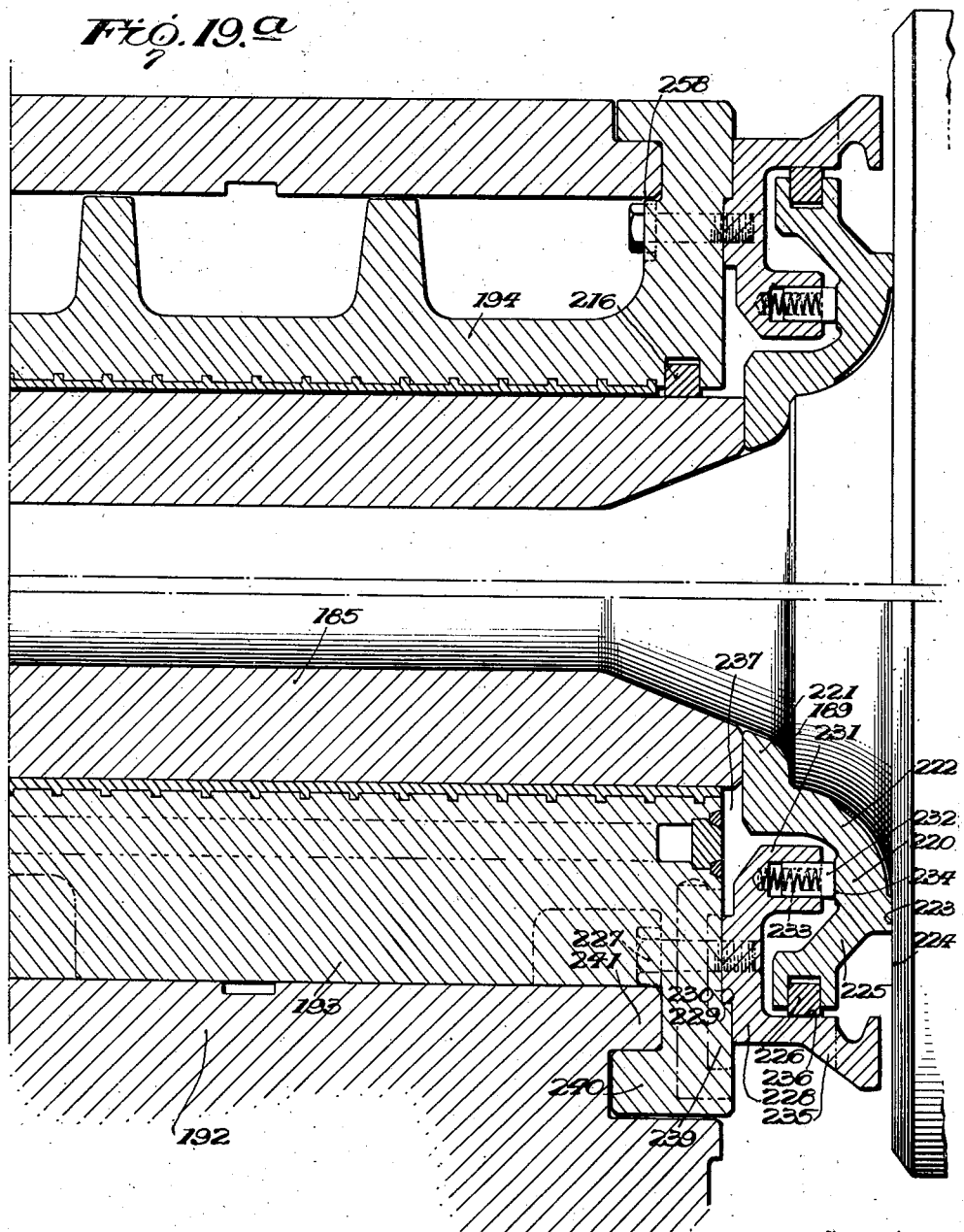

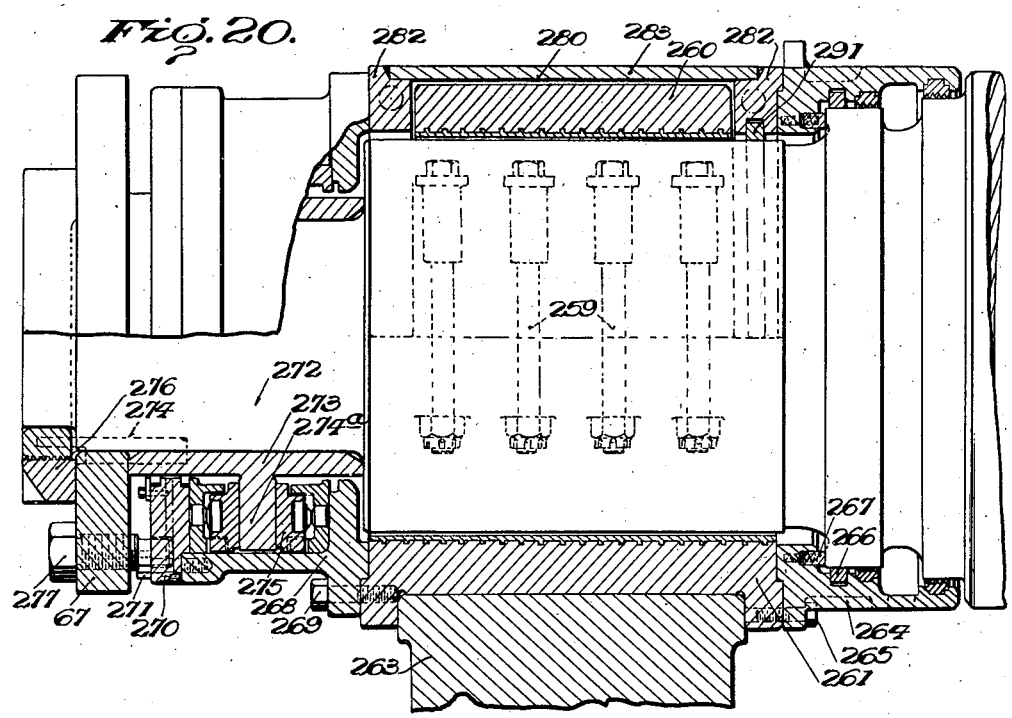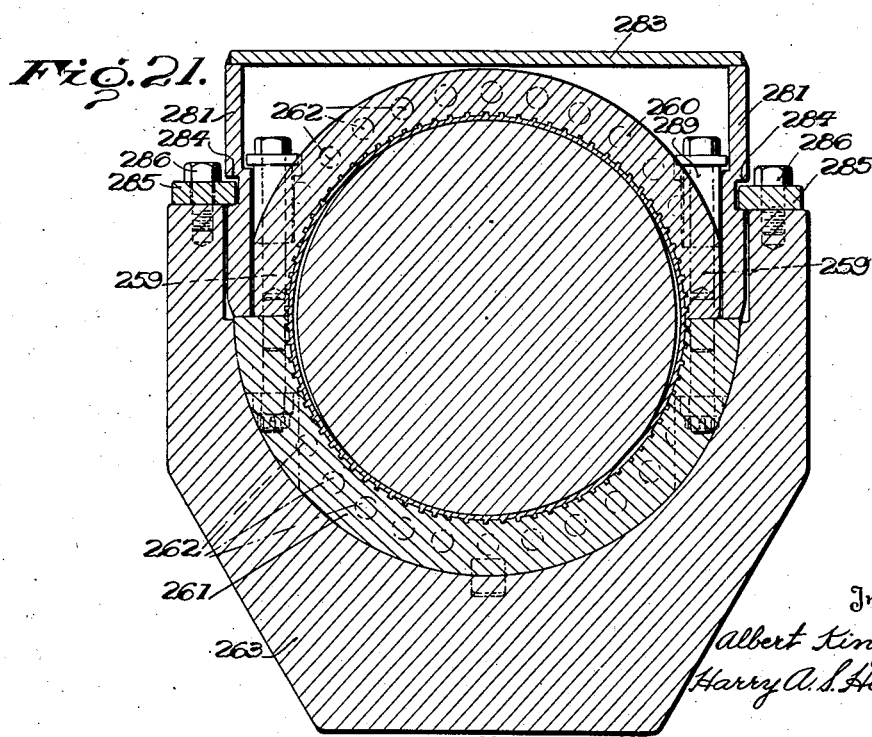

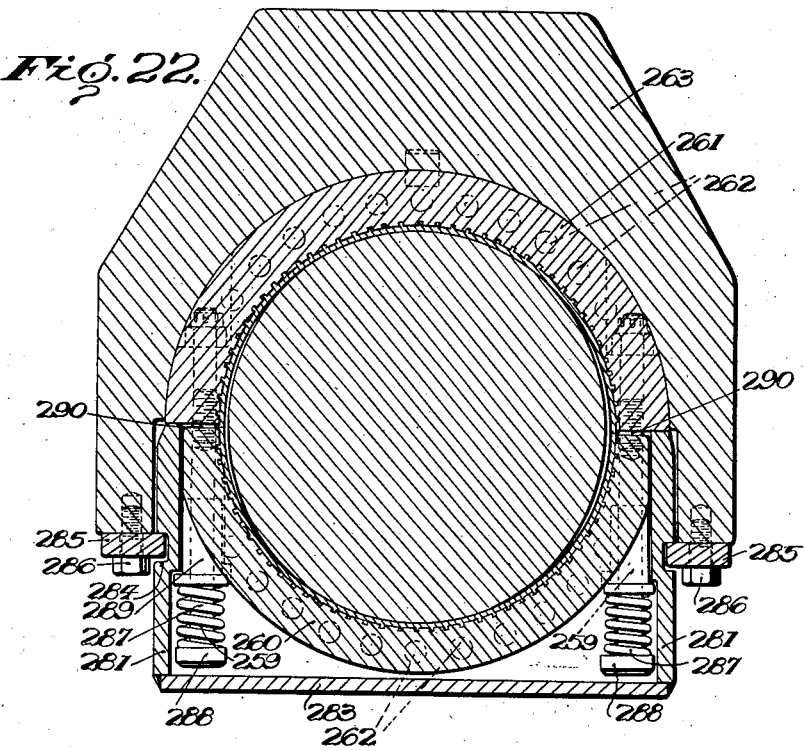
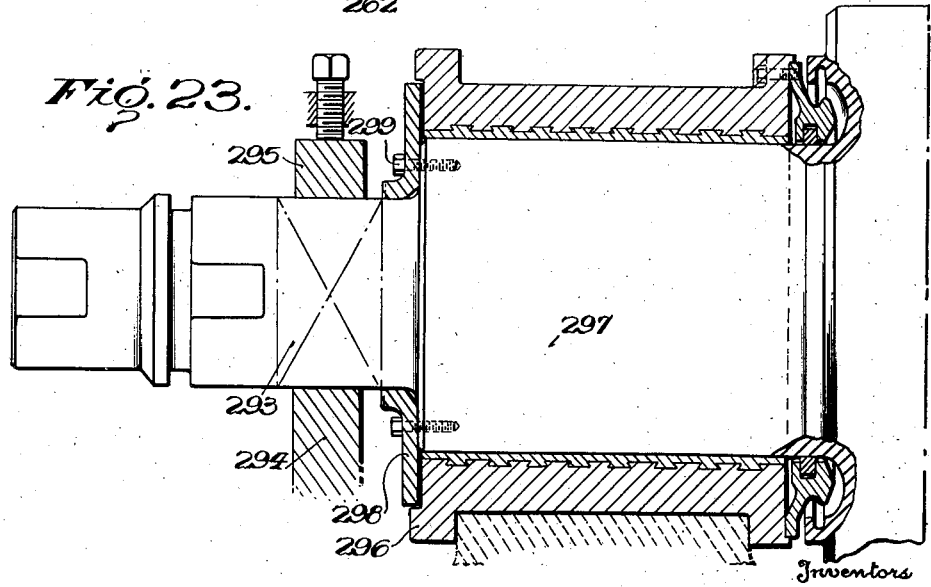

Patented May 20, 1941

2,243,009

UNITED STATES PATENT OFFICE 2,243,009

ROLLING MILL AND BEARING THEREFOR

Albert Kingsbury, Greenwich, Conn., and Harry A. S. Howarth, Philadelphia, Pa., assignors, by mesne assignments, to Mesta Machine Company, West Homestead, Pa., a corporation of Pennsylvania Application January 26, 1934, Serial No. 708,501

83 Claims. (Cl. 80—55)

This invention relates to rolling mills, and more particularly to the bearings thereof.

For convenience the invention will be chiefly described in conjunction with what is known in the art as a "four-high" mill, i. e., one wherein the working rolls providing the pass are respectively backed up by vertically alined rolls of substantially larger diameter, but it will be apparent to those skilled in the art that many of the features of the present invention, some by modification and adaptation, are applicable to bearings for other forms of mills. Also, for convenience, the bearings will be chiefly described with particular reference to their application to the necks of the backing-up rolls, but as will be apparent to those skilled in the art, certain features of the invention are applicable to bearings for the necks of working rolls. Therefore, it is to be expressly understood that the description of the invention as applied to the necks of the backing rolls of a four-high mill is not to be construed as excluding any other suitable use of the invention as hereinafter defined.

The primary object of the present invention is to provide a rolling mill with improved radial oil film bearings, the term "oil film" bearing being used to differentiate from bearings of the so-called "antifriction" type, such as roller bearings.

The passage of the rollers of an antifriction bearing through the load region has been found by experience to cause variations in the thickness of the plate or other element being rolled, apparently due to the alternating variations in the distribution of the load as the resultant alternately passes through a roller or between two rollers. These variations in thickness arise even though there is perfect accuracy in the concentricity and fit of the bearing parts, but experience has demonstrated that it is very difficult to get bearing races which are perfectly concentric as to the outside and inside diameters. Inaccuracies in the diameters of the races, particularly of the inner race, produce variations in thickness of the plate or other element being rolled, and no accuracy in the grinding of the rolls can prevent these variations. Moreover, rollers frequently become slightly oval or elliptic with use, and even though the diameters of the races are accurate, such oval or elliptic rollers tend to produce a marking of the plate by infinitesimal variations in thickness which may affect the saleability of the plate for some purposes.

It is an object of this invention to provide a rolling mill with improved radial oil film bearings whereby the foregoing variations in thickness and markings of the plate or other element being rolled are avoided.

The reduction of the metal going through the pass is a function of the speed of the rolls. Therefore, variations in roll speed produce variations in the gauge of the rolled metal. Hence the control of the gauge under changing roll speed is of very great importance, especially when it is remembered that under present practice as much as 20% of the rolled sheet is frequently found not to be of correct gauge, and therefore can only be sold at a reduced price. With oil film bearings the thickness of the film, other things being constant, is also a function of the speed, the film increasing with increase of speed. On the other hand, increase in speed of the working rolls tends to decrease the reduction. It is therefore an object of this invention to apply radial oil film bearings to the rolls under such conditions that the increased film thickness accompanying increased roll speed acts automatically to compensate largely if not completely for the accompanying tendency to increase the gauge, and vice versa.

Another object of this invention is to provide a rolling mill with radial oil film bearings wherein the rate of supply or the pressure of the oil supplied to the film is varied automatically with the speed of the rolls to the end that the thickness of the oil films will vary with the roll speed, inversely to the tendency of the changing roll speed to vary the gauge, so that the latter effect may be compensated by the variations in roll pressure thereby produced by the automatic variation of the supply of oil to the bearings.

The variations in oil film thickness or pressure as a compensating factor for variations in gauge accompanying variations in roll speed depend in part upon the viscosity of the lubricant and in part on the extent to which the rolls and their supporting housing can be flexed or stretched. The latter, for any installation, is a substantially fixed quantity, but the viscosity of the lubricant may vary under changes in temperature. Another object of this invention is to provide a rolling mill with radial oil film bearings wherein the temperature of the oil is varied automatically to aid in or provide for the foregoing compensating actions.

Another object of this invention is to provide a rolling mill with radial oil film bearings wherein changes in oil film thickness or pressure are employed to compensate for variations of gauge thickness with variations in speed and the viscosity of the oil is kept substantially constant by changing the cooling of the bearings simultaneously with the change in heat losses due to friction that accompany a change in speed.

Another object of this invention is to provide a rolling mill with improved radial oil film bearings whereby the starting friction can be materially reduced.

Another object of this invention is to provide a rolling mill with improved radial oil film bearings whereby the starting torque is reduced and therefore the wear on the parts incident to a high starting torque is diminished.

Another object of this invention is to provide a rolling mill with improved radial oil film bearings to the end that the accuracy of gauge of the plate or other element being rolled may be maintained.

Another object of this invention is to provide a device of the type just characterized wherein the bearings are provided with adequate lubrication.

Another object of this invention is to provide a device of the type just characterized wherein the bearings and roll necks are maintained at a proper temperature.

Another object of this invention is to provide a rolling mill with improved radial oil film bearings wherein the bearings are so mounted as to give suitable freedom to the rolls, both with respect to the unavoidable deflection in the rolls or their necks, and also with respect to changes in diameter and length of the roll neck and bearing parts due to changes in the temperature thereof.

Another object of this invention is to provide a rolling mill with an improved radial oil film bearing which has associated therewith a suitable thrust bearing for sustaining the axial thrust on the roll.

Another object of this invention is to provide a device of the type just mentioned wherein the thrust bearing does not interfere improperly with the expansion and contraction of the roll and its associated parts.

Another object of this invention is to provide a rolling mill with improved radial oil film and thrust bearing elements so associated therewith as to be readily mountable on and demountable from the mill in unitary relationship with the rolls.

Another object of this invention is to provide a device of the type just mentioned wherein the rolls may be stored with the bearing elements assembled on their necks in unitary relationship therewith, and whereby said bearing elements will suitably protect said necks during storage or during grinding of the rolls.

Another object of this invention is to provide a device of the type just referred to which is so constructed as to prevent the development of undue stresses in the parts during the mounting and demounting of the rolls with respect to the mill.

Another object of this invention is to provide a device of the type just referred to wherein the bearing elements may be readily removed from the necks of the rolls for inspection or repair.

Another object of this invention is to provide a rolling mill with improved radial oil film bearings which may be employed with sleeves suitably mounted on the roll necks.

Another object of this invention is to provide a rolling mill with improved oil film bearings which require a minimum change in the construction of the mill, and which may therefore be readily installed in mills already in service as well as provided in mills newly constructed.

Another object of this invention is to provide a rolling mill with improved radial oil film bearings and with means for properly protecting the bearing surfaces on the rolls when the associated bearing elements are removed.

Another object of this invention is to provide a rolling mill with improved radial oil film bearings which may be readily assembled and disassembled without injury to the parts.

Another object of this invention is to provide a rolling mill with an improved radial oil film bearing which may be adequately lubricated without excessive oil consumption and which is so constructed as to protect the bearing surfaces against ingress of foreign material during operation.

Another object of this invention is to provide a rolling mill with means associated with the roll bearings whereby the rolls and bearings may be readily inserted into and withdrawn from the mill frame as a unit without undue stress being imposed on the roll or the bearing parts.

Another object of this invention is to provide improved bearings for rolling mills which are highly efficient in service, compact in structure, and strong and rugged in operation, and which also possess various improved features in their lubricating and cooling systems.

Other objects of the invention will appear hereinafter from the detailed description of embodiments thereof as illustrated on the drawings.

The invention is capable of receiving a variety of mechanical expressions, some of which have been shown on the accompanying drawings for the purposes of exemplification, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures—

Fig. 5 is partly a section and partly an end elevation of the bearing shell and chuck;

Figs. 6 and 7 are fragmentary sections showing parts of the oiling system;

Fig. 8 is a diagrammatic view of the oiling and cooling systems;

Fig. 9 is a plan view on a reduced scale of the bearing-shell supporting block carried by the chuck;

Fig. 10 is a diagrammatic transverse section illustrating the separation of the chuck parts from the bearing shell;

Fig. 11 is a schematic view on a reduced scale to illustrate the manner in which the unit composed of roll, bearings and chucks is retained in the frame;

Fig. 12 is a schematic view on a reduced scale to illustrate means for protecting the roll neck when the cooperating bearing parts have been removed;

Fig. 13 is a somewhat schematic view to illustrate the means used to remove the roll unit and also showing the roll with its chucks removed and the bearing elements on the neck in proper position for storage or grinding;

Figs. 14 and 15 are schematic views on a smaller scale illustrating an alternative manner of mounting the bearing shells in the chucks;

Fig. 16 is a schematic view of a protecting sleeve for the roll neck with which a thrust bearing is associated;

Fig. 17 is a schematic view, with the bearing parts omitted for sake of clearness, to illustrate the use of a water cooled sleeve on the roll neck;

Fig. 18 is an axial section of a bearing using a sleeve on the roll neck and shell retaining means of the character indicated in Figs. 14 and 15;

Figs. 19 and 19a are axial sections of the ends of a roll neck bearing of somewhat different construction than shown in Fig. 18;

Figs. 20 and 21 are axial and transverse sections of another embodiment of the invention applied to a lower roll;

Fig. 22 is a view corresponding to Fig. 21 but showing the invention applied to an upper roll; and Fig. 23 is a view to illustrate protection of the radial bearing surfaces during grinding or turning of the roll.

Figure 1:
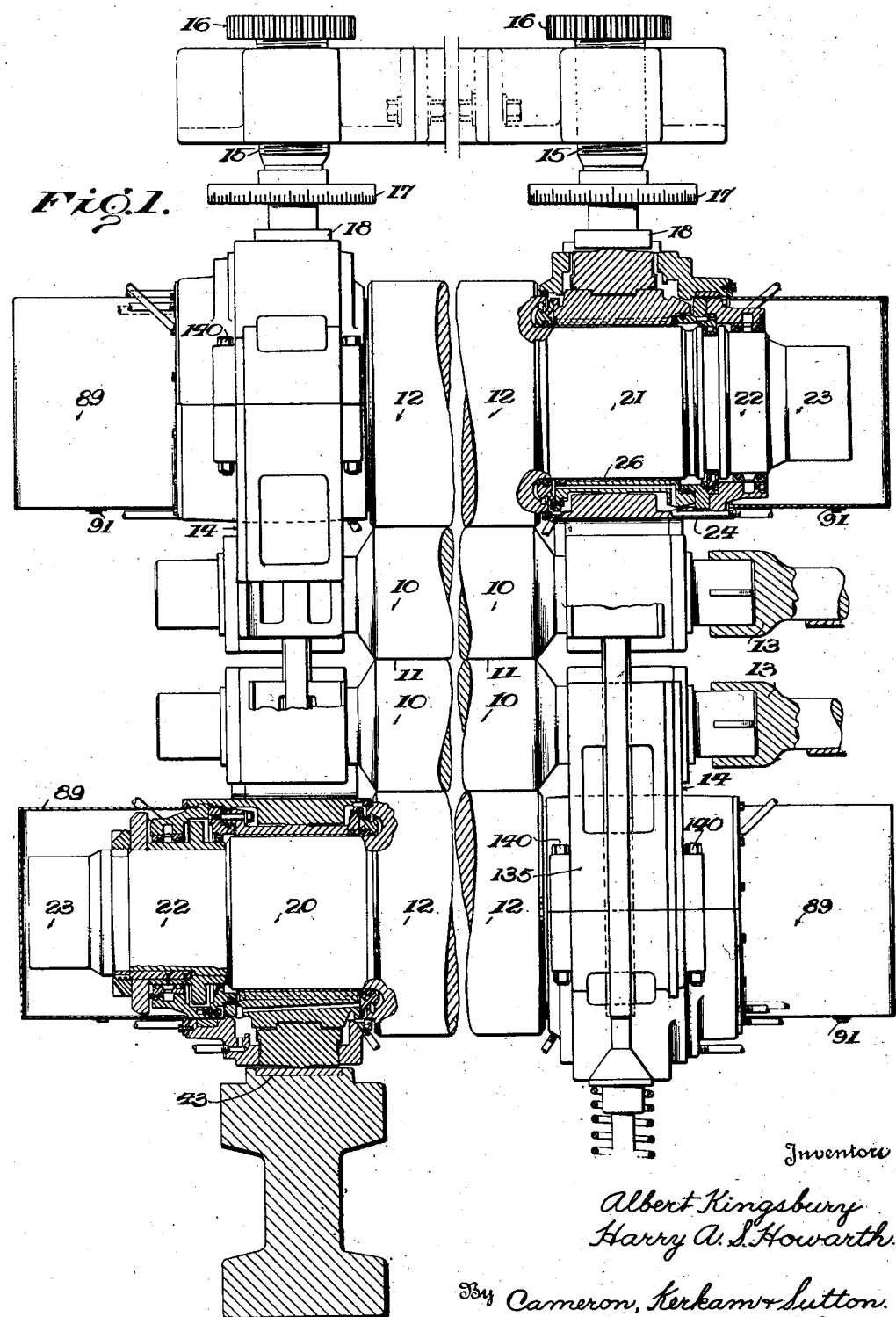
Fig. 1 is a somewhat schematic elevation of a rolling mill of the "four-high" type, showing in section the inner bearing of the upper roll and the outer bearing of the lower roll constructed in accordance with the present invention.
Figure 2:
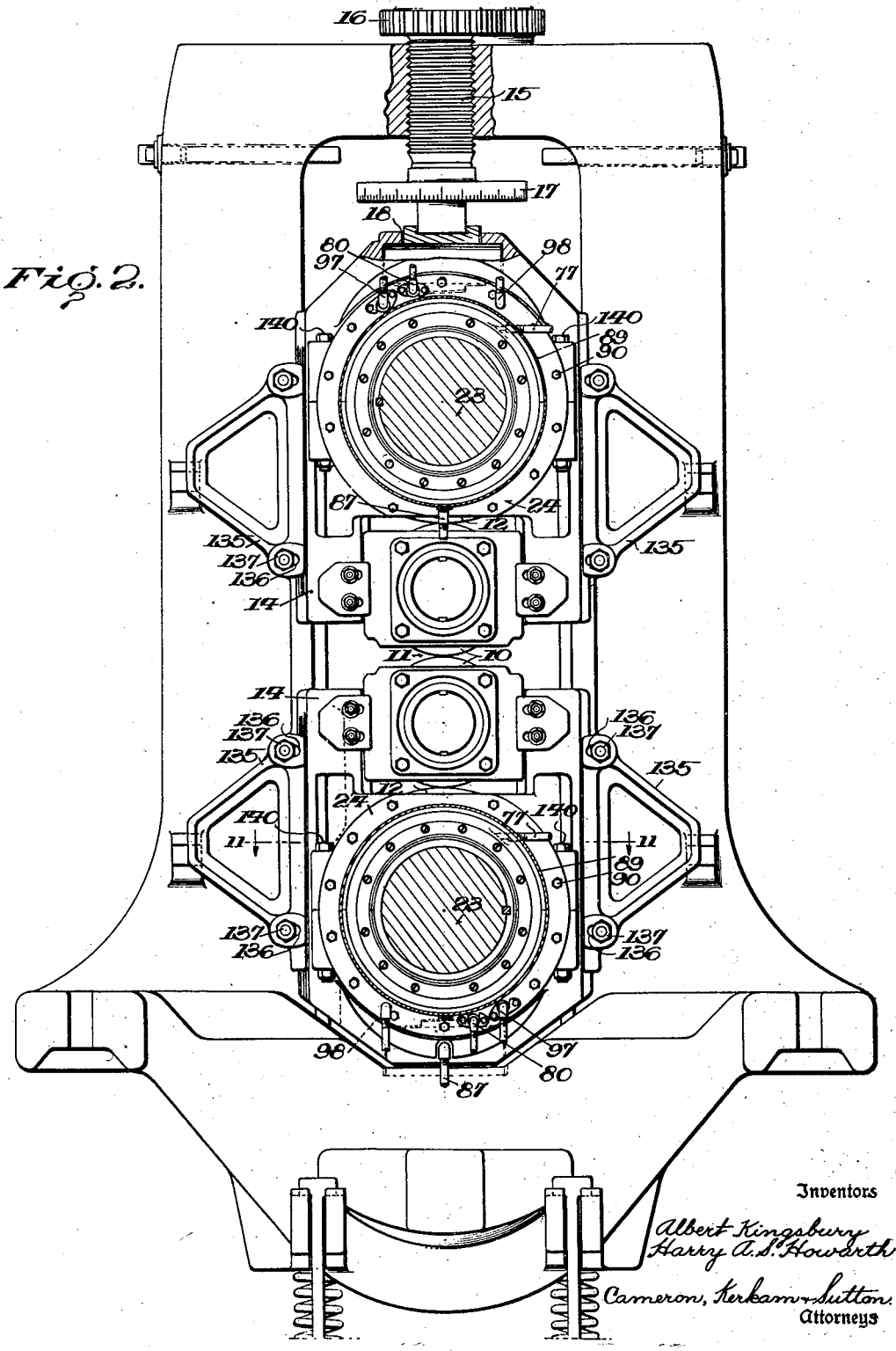
Fig. 2 is a transverse section of the structure of Fig. 1.

In the form of mill shown in Figs. 1 and 2 the working rolls are designated 10 and provided between the same the pass 11 for the material to be rolled. The mill illustrated is of the "four-high" type, and therefore each of said rolls 10 is backed by a roll 12 of substantially larger diameter than the working roll. In mills of the type illustrated the working rolls 10 are positively driven, as by a motor, through the flexible couplings 13 (Fig. 8) while the backing rolls 12 are driven frictionally from the working rolls. Each of said rolls is rotatably supported at the necks at the opposite ends thereof by bearing members supported in a housing 14 of appropriate size and strength.

The present invention possesses particular utility when applied to the bearings of said backing rolls, and is illustrated and described as applied to such use. Said rolls are commonly mounted to be moved into and out of their approximately operative positions in the direction of their axes, and to this end the bearings at the necks of the respective rolls are carried by suitable chucks which are locked in the housing as hereinafter explained in detail. The mill is provided at each end of the upper backing roll with a screw 15 (Fig. 2) driven by gearing 16 for regulating the pressure between the working rolls and thereby varying the pass, said screws being shown as having indicating graduated disks 17 and seating in the recesses of cup-like members 18 which engage the hereinafter described tiltable bearing blocks for the bearing shells of the upper backing roll bearings. As the construction of the mill outside of the units composed of the rolls with their associated bearing elements and parts form no part of the present invention, the mill, as to its general construction and relationship of parts, is or may be of usual or any suitable form as has been diagrammatically indicated in Figs. 1 and 2.

In conformity with the present invention each roll neck is carried by a bearing of the radial oil film type, and associated with each roll, adjacent the radial oil film bearing at the outer neck thereof, is a thrust bearing, preferably also of the oil film type, the present invention permitting the use of a single thrust bearing for each roll.

In rolling metal strip from a slab, the extent of the reduction of the metal decreases with an increase in the speed of said rolls. Hence the changes of speed which occur during the period when the mill is starting and stopping, and any variations in speed while the mill is in operation, cause changes in the gauge of the material being rolled. An oil-film bearing, on the other hand, possesses the characteristic that the thickness of the film increases with the speed of rotation of the relatively movable bearing parts. By suitably selecting the viscosity of the lubricant the oil-film bearing can be so constructed that the increase in film thickness with increase of roll speed largely if not exactly compensates for the increase in gauge which accompanies such change in roll speed.

We do not rely solely on automatic change in film thickness with change of roll speed. The oil film bearing possesses the further advantage that this effect may be supplemented and controlled by changing the rate of supply or the pressure of the oil supplied to the bearing so that by exteriorly regulating the oil supply, the oil film may be changed to compensate for the change in gauge that would otherwise arise from change in roll speed. Thus the thickness of the oil film may be augmented by use of high-pressure oil whose rate of application or supply may be under the control of any suitable variable such as roll speed, cooling water temperature, etc.

The present invention therefore involves the method of automatically compensating for changes of gauge that would otherwise arise from changes in roll speed by changes in the pressure of the oil film, whether arising solely from the change in film thickness accompanying change in the speed of the roll, or caused or supplemented by a change in the pressure or in the rate of supply at which high-pressure oil is applied to the bearing. For example, if the change in the oil film thickness is too great or too small upon change in roll speed, the desired oil-film thickness can be maintained by changing the rate of supply or the pressure of the oil being supplied to the bearing. Thus the rheostat or other control for the motors which drive the rolls can be suitably connected with the high-pressure pumps which supply the oil to the oil films so that the thickness in the oil film will change in a predetermined manner with the change in the roll speed to the end that uniformity of gauge may be maintained.

The effect of the aforesaid compensating action is dependent in part upon the viscosity of the oil. Increased speed is accompanied by increased friction losses and heat generation in the bearings which may result in turn in a change in the viscosity of the oil. The present invention also includes the method of varying the cooling at the bearing so that the same viscosity will be maintained or the change in viscosity may be suitably controlled. Thus as speed increases, the circulation of cooling water in heat interchanging relation with the bearings should increase to carry away the increase in heat losses arising from friction if the oil viscosity is to be maintained constant, and therefore the rheostat or other control which determines the speed of the motor may be suitably connected to the water-circulating pumps so as to vary the circulation of cooling water as the speed of the rolls is changed, or the temperature of the water may be automatically varied to accomplish the same result. Alternatively the viscosity of the oil may be predeterminately varied by controlling the rate of supply or the temperature of the cooling water. Furthermore the rate of supply or the pressure of the high-pressure oil may be varied with the water temperature as well as with the roll speed, and either or both of these controls may be used to maintain the desired constant or variable film thickness which will produce the desired compensation for the tendency of the gauge to vary.

In addition to the foregoing advantages possessed by an oil-film bearing, is the fact that the distribution of pressure over the bearing surfaces is regular, i. e., there is no irregular or periodic change in concentration or distribution of pressure such as exists, for example, in a roller bearing when the resultant of the pressure passes relatively from the radial plane of the axis of a roller to a plane intermediate the radial planes of the axes of adjacent rollers. Hence not only does the present invention eliminate difficulties heretofore experienced with respect to changes in gauge arising from changes in roll speed, and losses due to gauge change when the mill is being brought into operation and stopped, but the present invention also eliminates those changes in thickness which arise when antifriction bearings are used.

Furthermore, use of a radial oil-film bearing permits the employment of high-pressure oil on the roll bearings when the mill is put in operation, and thereby the heavy wear incident to starting friction is very largely overcome. In mills of the type under discussion, the working rolls are ordinarily driven directly, and the backing rolls are driven by friction. If the screws which determine the gauge thickness are tightened so that the surface friction between the working and backing rolls is sufficiently great, the working rolls when positively driven will drive the backing rolls and thereby overcome the starting friction in the bearings of the latter. If there is slippage between the rolls in starting, this wears the rolls, and if the friction is so great that no slippage can occur, there still remains the heavy wear in the bearings of the backing rolls at starting. By using high-pressure oil during the starting period an oil film may be preliminarily established between the bearing surfaces of the backing-roll bearings so that starting friction is reduced to a minimum. However, if preferred, this use of high-pressure oil at the starting may be omitted, and the invention still possesses important advantages as above discussed with respect to maintaining uniformity of gauge etc.

The present invention also permits the omission of sleeves on the necks of the rolls, and thereby the elimination of the difficulties heretofore experienced in grinding the sleeves exactly concentric with the roll necks, in the tendency of the sleeves to creep, etc. The necks of the rolls as ordinarily constructed are sufficiently hard so that with the use of a proper oil film between the bearing parts there is no excessive wear. However, if preferred, the necks of the rolls may be provided with sleeves of any suitable character and construction and mounted on the roll necks in any suitable way. As illustrated, some of the embodiments use the surface of the neck itself as the bearing surface while in others a sleeve is employed, but it is to be expressly understood that either construction may be used in embodiments of this invention.

Figure 3:
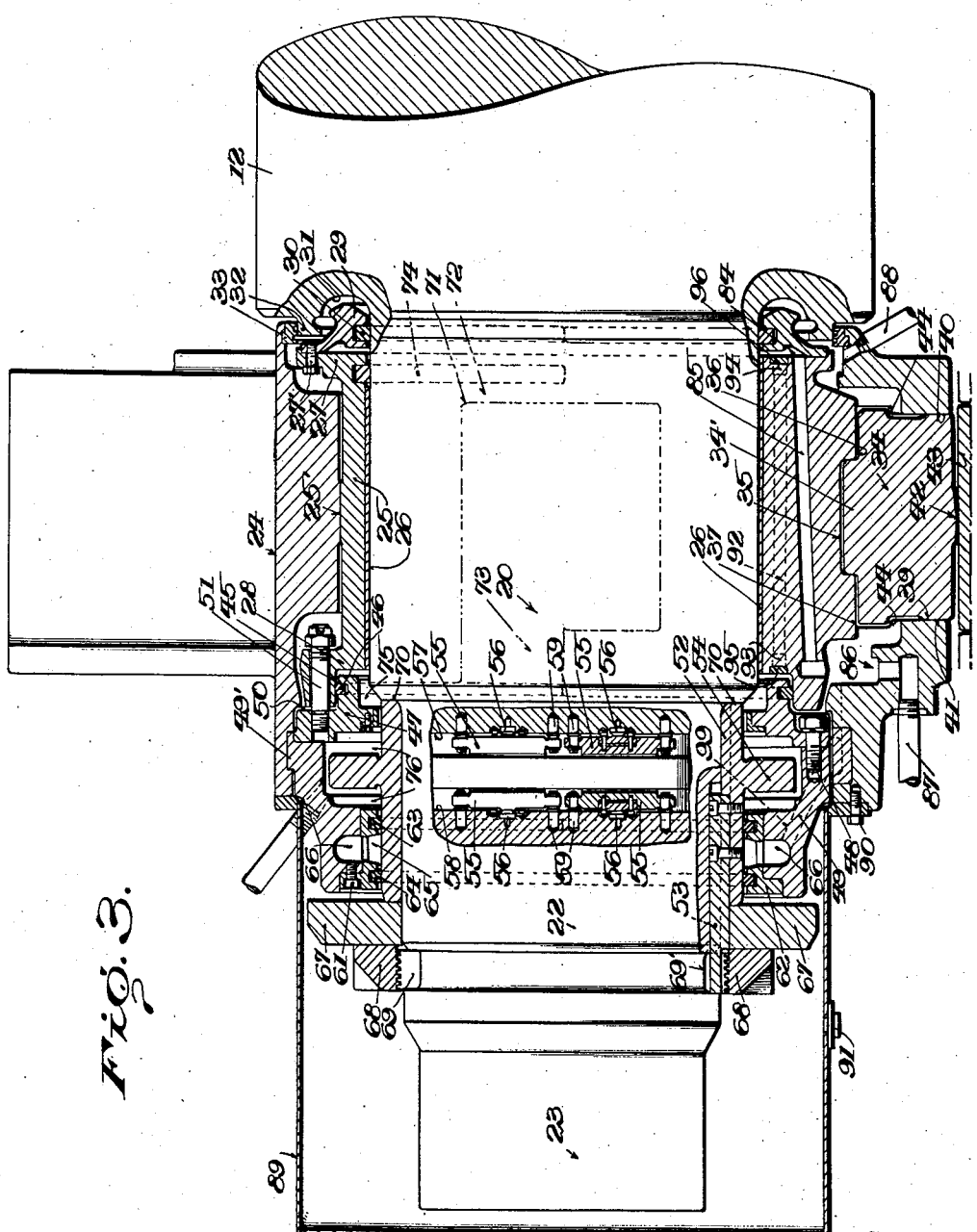
Fig. 3 is an enlarged axial section of the embodiment of this invention applied to the outer neck of a backing roll.
Figure 4:
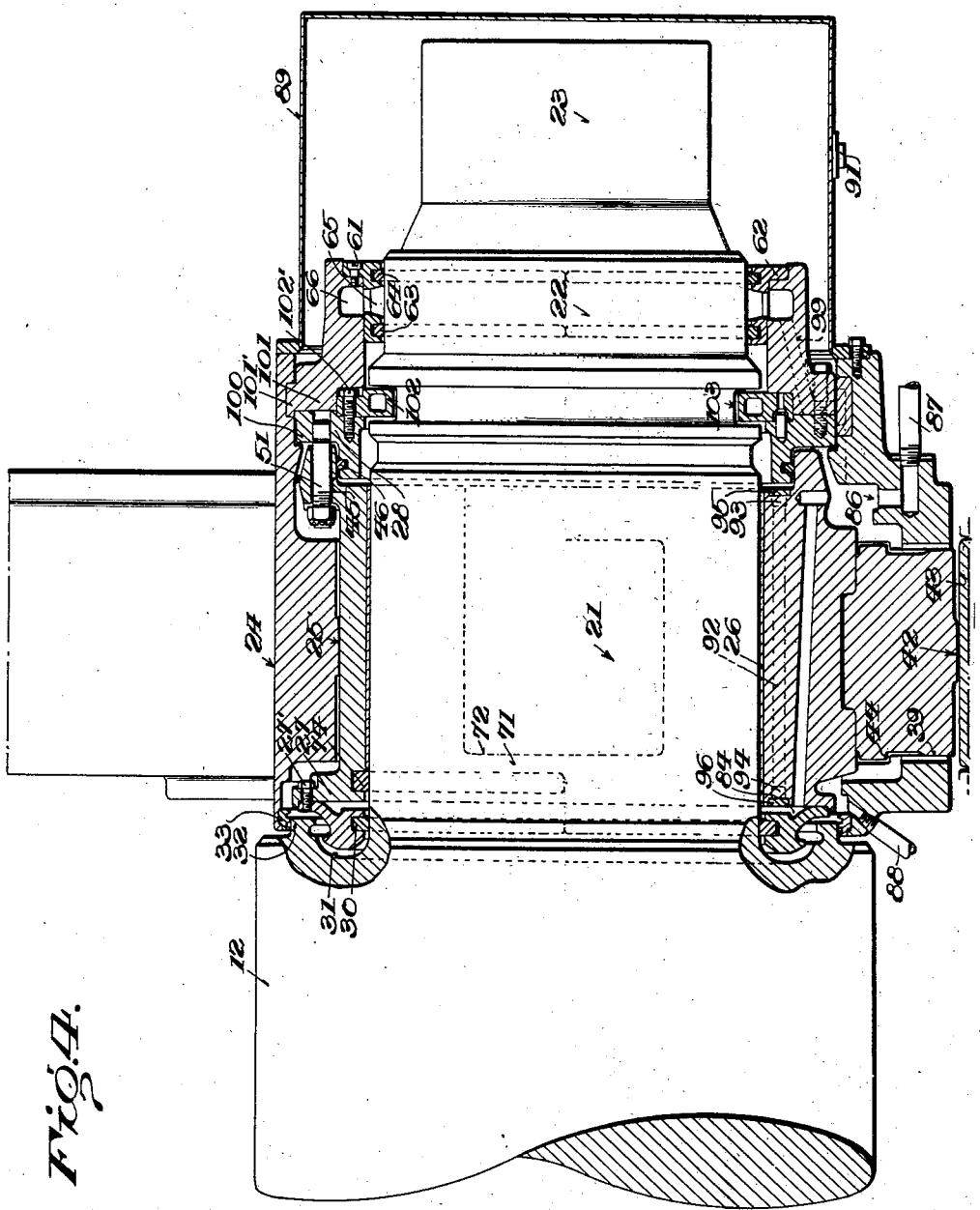
Fig. 4 is a corresponding section of the bearing for the inner neck of the same backing roll as shown in Fig. 3.

Referring now more particularly to the first embodiment shown on the drawings, Figs. 3 and 4 are complementary views showing the improved radial oil-film bearings applied to the necks of the lower roll and with a thrust bearing disposed adjacent the radial bearing at the outer neck of the roll, but it will be understood that the upper roll is provided with similar bearings but with the bearing shells inverted to accord with the reversal in the direction of the pressure. Roll 12 has the usual necks 20 and 21 with which cooperate the radial oil-film bearings next to be described. Projecting beyond the neck 20 is a portion 22 of smaller diameter, said portion adjacent the outer neck having associated therewith the thrust bearing to be described, and beyond said portion 22 is a portion 23 of a diameter somewhat smaller than the portion 22 and which may be designed for engagement with the conventional hook employed in mounting and demounting the roll.

Cooperating with the bearing surface provided by the cylindrical surface of the neck 20 and mounted in a chuck generally designated 24 is a bearing shell 25 which, as shown at the left in Fig. 5, may have its outer surface eccentric with respect to its inner bearing surface 26, with the thicker portion of the bearing shell thus provided disposed at that side of the neck which is 180° removed from the working rolls. The inner bearing portion 26 may be of any suitable material, character, and form, depending upon the service to which the bearing is to be put. At its opposite ends bearing shell 25 is provided with flanges 27 and 28 (Fig. 3). Flange 27 has suitably attached thereto, as by screws 27', a ring 29 which carries an oil retaining ring 30 cooperating with the peripheral surface of the neck, the end of the roll being shown as provided with a recess 31 to receive the oil retaining ring 29, 30 and said roll also having an axially extending flange 32 for cooperation with an oil retaining ring 33 on the chuck.

Bearing shell 25 is pivotally mounted within the chuck for axial tilting by a generally rectangular supporting block 34 having a dowel projection 34' which enters a corresponding recess 35 in the shell and which, as shown in Fig. 9, may have four raised portions 36 symmetrically disposed to make bearing engagement with a flat surface 37 on the shell. In order to minimize interference with the tilting of the bearing shell 25, said shell at its upper portion is shown as having only an axially narrow contact at 25' with the bore of the chuck. Contact between the bearing shell and chuck at this point may be reduced to zero if the shell is otherwise suitably supported within the chuck. Bearing block 34 has contiguous to the inner extremity of its lateral surfaces a pair of opposed finished surfaces 38 (Fig. 5) at its two sides which are lateral with respect to a vertical plane through the axis of the neck and which engage corresponding finished surfaces in the aperture 39 provided in the chuck for said block. Said bearing block also has contiguous to the outer extremity of its lateral surface a pair of opposed finished surfaces 40 (Fig. 3) at its two sides which are spaced axially of the neck and which engage corresponding finished surfaces 41 in said aperture 39. The outer surface of said bearing block has a centrally and transversely disposed curved or tapered boss or knife edge 42 adapted to engage a hardened plate or distance piece 43 suitably mounted on the housing (Fig. 1) thereby providing a pivotal axis on which the bearing shell may tilt freely in the direction of the axis of the neck to permit proper alinement of said shell with the neck under such deflection as unavoidably arises from the pressures involved. At the same time said dowel block, with its aforesaid surfaces of engagement with the chuck, prevents rotation and other improper displacement of the bearing shell with respect to said chuck. As shown, said block also has overhanging shoulders 44 which may engage the chuck around the opening 39 so that the block will be retained in the chuck when the chuck is removed from the mill with the roll.

Flange 28 projects axially beyond the shell 25 and has its inner overhanging surface 45 in cooperation with an oil retaining ring 46 suitably mounted on a ring 47 which is attached in any suitable way, as by screws 48, to a ring 49 which provides with said ring 47 a housing for the thrust bearing at the outer neck of the roll. In order to secure said thrust bearing housing to the bearing shell 25 and also to close up the gap which normally is left at 50 to permit relative axial movement between the bearing shell 25 and the housing for the thrust bearing, flange 28 is also provided with stud bolts 51 which have threaded engagement with the ring 47 and pass freely through apertures in the flange 28. As shown, said housing ring 49 is normally supported by and located with respect to the chuck by the engagement of a peripheral flange 49' on the ring in a corresponding peripheral recess in the chuck. Thereby the thrust load of the thrust bearing is transmitted in its entirety to the chuck, and none of said load is transmitted to the bearing shell. At the same time the joint between the inner periphery 45 of the ring 28 and the oil retaining ring 46 permits axial tilting of the bearing shell without interference by the thrust load or the parts of the thrust bearing. Surface 45 may be beveled axially as shown to facilitate assembly.

Portion 22 of the outer neck is provided with a sleeve 52 which is suitably secured to the neck as by a key 53. Formed on or suitably attached to said sleeve 52 is a flange 54 which constitutes the thrust collar. Cooperating with the opposed faces of said thrust collar are suitable thrust receiving bearing members, preferably of the surface bearing type, and here shown as shoes 55 of the Kingsbury type tiltably mounted at 56 in a manner well understood in the art to form wedge-shaped oil films between the bearing faces of said shoes and the bearing faces of said collar. It is to be expressly understood, however, that in place of a plurality of shoes other suitable forms of thrust bearing may be employed. For example the stationary bearing members may take the form of self alining washers having spherical rear surfaces engaged in correspondingly shaped seats, particularly if one of each pair of cooperating bearing surfaces is grooved and beveled adjacent the grooves to facilitate the forming of the oil films. As shown, two pairs of shoes 55 engage each face of the collar 54 with one pair on each side of the neck and with the shoes of each pair symmetrically arranged with respect to the horizontal plane through the axis of the neck. The shoes 55 are tiltably mounted on the radial face 57 of the ring 47 and on the radial face 58 of the ring 49, and suitable dowels or pins 59 prevent improper displacement of the shoes. In the bearing as illustrated, no provision for equalization of pressure between the thrust bearing shoes is shown, but it is to be expressly understood that if preferred any suitable form of equalizing means, such as a series of bridged and tiltable equalizing blocks, may be employed for effecting the proper distribution of pressure between the shoes at each face of the thrust collar.

Mounted within the outer end of the ring 49, and suitably secured therein as by screws 61 is a ring 62 which carries oil retaining rings 63 and 64 at axially opposite sides of a recess 65 therein and which is in open communication with a recess 66 in the ring 49.

As shown, the portion 22 of the neck is also provided with a collar 67, suitably retained thereon as by a ring nut 68 engaging a split threaded collar 69 held in a groove 69' in neck portion 22, for a purpose hereinafter explained. When ring nut 68 is tightened up, the thrust bearing sleeve 52, through collar 67, is clamped against the shoulder 70 between the portions 20 and 22 of the neck. In some cases the collar 67 may be omitted, in which event the ring nut 68 may engage directly with the end of the sleeve 52.

The inner or bearing face of the shell 25 is cut away as indicated in dotted lines at 71 in Fig. 3, said cut away portions being approximately 90° removed from the radial plane which contains the resultant of pressure. At the inner axial extremity of the bearing surface, however, the bearing surface is a complete annulus as indicated at 72, and the outer axial extremity may be a complete annulus except for the gap at 73. As shown, an oil retaining ring 74 is also provided for cooperation with the low-pressure half of the annulus 72, adjacent to but axially inside of the oil retaining ring 30. By using a half-ring seal as shown a relatively large clearance may be used at the bore of the gap without a corresponding loss of oil by leakage or a loss of effective length in the direction of the axis of the loaded side of the bearing surfaces. Said ring member 74 may be retained in position in any suitable way, as by springs at the ends thereof acting generally tangentially but with a radial component. At the opposite end of the shell the radial bearing surface is in communication with an annular space 75 which in turn is in open communication with chambers 76 within which are disposed the thrust bearing members. The main oil supply for the radial bearing enters the thrust-casing chambers 76, as shown at 77 in Fig. 5, and from these chambers the oil may flow freely through the annular space 75 to the radial bearing surfaces, filling the pockets 71 and providing an oil film between the bearing surfaces of the neck and bearing shell. This supply of oil may be a gravity-feed supply.

When oil under high pressure is also furnished to the radial bearings for reasons heretofore explained, the high-pressure oil is led through a suitable pipe coonnection 78 (Fig. 6), preferably provided with a readily disconnectible joint at 79, and through a suitable pipe extension 80 held at its inner end in a socket in the end of the bearing shell by a threaded thimble 81. Said pipe section 80 is provided with a check valve 82 and communicates with passages 83 leading to the bearing surfaces between the neck 20 and shell 25. The high-pressure oil is preferably distributed to four symmetrically arranged points, two of which lie in a circle approximately one-third of the length of the bearing shell from each extremity thereof, and the two points in each circle being equidistant from and on opposite sides of the plane through the axis of the roll which contains the resultant of pressure. The provision of these points of delivery of the high-pressure oil may be considerably varied, but it is desirable that the high-pressure oil be introduced symmetrically with respect to the four points of support 36 on block 34 so that the pressure has no tendency to spring the bearing surfaces out of shape. Oil so supplied under pressure may be used either to establish an oil film between the bearing surfaces for the purpose of reducing starting friction or to control the thickness of the oil film in the compensation of the effects of varying speed as heretofore explained in detail.

Whether or not the main oil supply is formed by or supplemented by a high-pressure oil supply, the chambers 76 and 75, and the oil pockets 71 are normally maintained full of oil. From this oil a film forms between the bearing surfaces of the neck and the bearing shell during rotation. Leakage of oil past the annulus 72 is restricted by half ring 74, but such oil as passes said annulus is caught in the annular cavity 84 and is largely prevented from escaping by the oil retaining ring 30. If high-pressure oil is used, there may be an excess pressure on the oil in the cavity 84, but this is advantageous as it tends to prevent water and dirt from getting from the outside into said cavities and onto the bearing surfaces. Oil passing into said cavity 84 flows through passage 85 into annular cavity 86 in the chuck and may be returned to the oil supply through pipe 87 suitably secured to an outlet passage in the chuck. Since water cooling is employed as hereinafter explained, no circulation of the oil is necessary, and the oil flowing through cavity 84, passage 85, cavity 86 and pipe 87 is only such oil as leaks past the annulus 72, and as this oil is uncontaminated, it may be returned to the sump for use over again. It will also be noted that any oil escaping past the oil retaining ring 46, between the bearing shell and the thrust bearing housing, will also flow into cavity 86, this also being uncontaminated oil.

Any oil escaping past the oil retaining ring 30 into cavity 31 may be led away through drain pipe 88. Any oil leaking past the oil retaining ring 63 is collected in the chambers 65 and 66 which form an oil seal and from those chambers oil is returned to the system, as it is uncontaminated, through a suitable passage leading to chamber 86. Any oil escaping past oil retaining ring 64 may be collected in the housing 89, provided to exclude water, dirt, grease, etc. from the outer end of the neck and suitably secured to the chuck as by screws 90, and flow therefrom through a drain connection such as diagrammatically indicated at 91. Oil from drain connections 88 and 91 is likely to be contaminated because of water and dirt working past the oil retaining ring 33 or into the housing 89, and hence should not be returned to the sump.

As heretofore referred to, provision is made for suitably cooling the bearing shell 25 so that the viscosity of the oil will be suitably controlled. As illustrated, the thicker half of the bearing shell 25 is provided with a series of axially extending communicating passages 92. The bearing shell may be made of forged steel and a groove may be machined in each end of the shell as shown at 93 and 94 in communication with said passages 92, these grooves being closed by rings 95 and 96 suitably welded in place. Hence the passages 92, 93, 94 provide a zigzag conduit through which water may be circulated, suitable inlet and outlet connections being carried by the bearing shell as indicated at 97 and 98 in Fig. 5. The inlet and outlet pipes for the water are preferably provided with readily disconnectible joints adjacent the shell similar to that of the inlet for high-pressure oil as shown in Fig. 6. The water circulation thus provided assures that the oil film is maintained sufficiently cool to function properly, because the viscosity of the oil is suitably controlled, or maintained constant if desired, while the hardness of the bearing portion 26 is preserved so that the bearing metal is not softened under the high temperature which might exist in the roll unit neck under the high unit pressure in the film, if all of the heat had to traverse the length of said bearing portion in order to escape.

Referring now to Fig. 4 which shows the radial bearing provided for the neck 21 at the opposite or inner end of the roll, it will be observed that the construction is substantially the same as that described in conjunction with Fig. 3, except that the bearing at this end does not include a thrust bearing, the one thrust bearing at the outer end of the roll being sufficient to sustain the thrust existing on the roll. Rings 100 and 101 are generally similar to rings 47 and 49, with slight modifications. The ring 101 is held in position by a peripheral flange 101' extending into a corresponding peripheral recess in the chuck 24. The ring 100 has a split ring 102 secured thereto by screws 102'. The inner periphery of the ring 102 extends into a groove 103 in the roll neck and has all-around clearance relative to the latter. The ring 102 serves to hold the bearings on the neck when the roll is being removed from or replaced in the mill. Otherwise the parts as shown in Fig. 4 are substantially the same and are given the same reference numerals as the corresponding parts in Fig. 3, and have the same function and operation.

As heretofore indicated the bearings for the upper roll are substantially the same as those which have been described in detail in conjunction with Figs. 3 and 4 as applied to the lower roll except that the bearing shells 25 are inverted so that the thicker portions thereof are above the roll necks instead of below as in the case of the shells for the lower roll. In the case of the upper shells, however, the passages for the flow of oil under gravity are of necessity changed with respect to the inverted thicker portions of the shells. Thus the passage 85 by which the oil is led from chamber 84 to chamber 86 is still disposed adjacent the lower portion of the shell where the shell has sufficient thickness to receive the same. With the upper bearings the members 18 take the place of the distance pieces 43 in acting as a support for the tiltable blocks 34.

Referring now to Fig. 8, the complete oil circulation system is shown diagrammatically and includes a head tank 105 which communicates through overflow pipe 106 with sump 107. Leading from sump 107 is a pipe 108 which communicates with the inlet or suction valves of a low-pressure pump 109 driven in any suitable way as by motor 110. Also communicating with head tank 105 is a pipe 111 which leads from the outlet valves of the pump 109 by which said head tank is kept full of oil up to the level provided by the overflow pipe 106. From head tank 105 pipes 112 and 113 lead to the several inlets 77 for the gravity supply of oil to the several bearings as heretofore referred to.

A high-pressure pump 114 having a separate cylinder for each radial bearing is driven in any suitable way as by motor 115 and has its inlet pipe 116 in communication with the gravity feed system, as pipe 113, and its four outlet pipes 117, 118, 119, 120 respectively leading to the inlet pipes 78 of the several radial bearings. The oil collected from the outlets 87 is returned to the sump by pipes 121, while the oil collected from the outlets 88 and 91 is led to a separate waste tank through pipes 122. The high-pressure pump has suitable relief valves 123 with pipes 124 leading to the sump. Each of the inlets to pipes 108, 112 and 113 and the outlet of pipe 111 is provided with a suitable screen 125, while each of the gravity and high pressure feed lines is preferably provided with a suitable screen 126 adjacent to the bearing with which it is connected. Suitable sight feeds 127 are provided in the lines 112 and 113 and the various lines may be provided with suitable valves to control the same.

Fig. 8 also illustrates in part the water circulating system with its inlet pipes 128 which communicate with any suitable source of supply, as a pump, and its outlet pipes 129. Suitable valves, sight feeds, etc., as indicated at 130, may also be provided in these lines. As heretofore explained the flow of cooling water may be so regulated as to maintain a predetermined viscosity of the oil. Thus the flow or the temperature of the cooling water may be controlled to maintain a predetermined temperature at the bearing by any suitable automatic regulation dependent on the temperature of the water flowing from the bearing or the temperature at any other suitable point of control. By controlling either the temperature or the rate of flow of the cooling water the temperature of the oil at the bearing may be controlled so as to control its viscosity. When the mill is stopped the water flow should cease so that the temperature of the parts at the bearing may equalize, as otherwise the cooling action at only one side of the roll neck might produce bending or warping of the roll neck. If preferred, however, the water cooling may be applied throughout the circumference of the shell.

It is desirable that each roll be removable from the mill with its associated bearings and the chucks thereof mounted on the roll in unitary relationship therewith. To removably lock this unit in the mill housing when the roll is in operative position, the inner chuck is provided with slots 132 as shown in Fig. 11, and the outer chuck has lips or small flanges 133 which are disposed parallelly with the vertical faces of the housing. Slidably mounted on the frame are locking plates 134 and 135 adapted to engage in said groove 132 and with said rib 133, respectively, and lock said unit against axial displacement. Said locking plates may be of triangular form as shown at 135 in Fig. 2 and have elongated slots 136 movable with respect to bolts 137, so that when said bolts are loosened the locking plates may be moved radially with respect to the roll, thereby freeing the roll unit so that it may be moved axially outward, or to the left as shown in Fig. 11. When the roll is so moved outwardly, the bearings on its two necks and the chucks associated therewith move with the roll as a unit, any suitable means being provided to prevent improper displacement of the chucks with respect to the bearing elements. In the form shown, rings 49 and 101 have peripheral ribs 49' and 101' which as heretofore explained are received in corresponding grooves in the chucks, and as said rings are respectively connected to rings 46 and 100 by screws 48 and said latter rings are connected to the bearing shells 25 by the screws 51 as heretofore explained, axial displacement of the chucks with respect to the bearing elements is prevented.

For removing the roll with its associated bearings and chucks as a unit from the mill, it is customary to provide a hook 145 as shown in Fig. 13, said hook having a cylindrical recess 146 which fits the end 23 of the outer end of the roll neck and being curved so that its center of support 147 is vertically in line with the center of gravity when supporting the unit, as well understood by those skilled in the art, said hook also having a second support 147' in vertical alinement with the center of gravity of the hook when it is not supporting the unit. It is preferred that the hook also provide a second point of support for the roll, and to this end the recess thereof has a portion 148 of larger diameter which is adapted to engage the collar 67 mounted on the roll neck as heretofore explained. An analysis of the stresses existing in the roll and associated parts when the roll is lifted by the hook shows that no undue stress is imposed on any of the parts. The weight of the roll and its associated parts is sustained by the hook in engagement with the portions 23 and 67, while the bearing parts hang freely on the necks of the roll, and the couple of stress is transmitted wholly to the roll body, no stress being imposed on the bearing parts. It is to be understood, however, that the collar 67 may be omitted and the hook engage only the end 23 if preferred. To permit removal of the chucks and bearings with the roll, each of the oil and water lines is provided with a readily disconnectible coupling adjacent to the chuck so that each of said lines may be disconnected before the unit is removed. Such a coupling is illustrated at 79 in the high-pressure oil line, and corresponding connections are provided in the other lines. To prevent ingress of dirt during the period when the lines are disconnected the pipe ends, particularly those in the oil feed system, should be carefully capped.

When the unit composed of the roll with its associated bearings and chucks has been removed from the mill, each chuck, which is made in halves separable on a horizontal plane with the halves suitably united as by bolts 140 (see Fig. 2), may be separated into its halves and the halves removed as shown in Fig. 10. In order that the pipe sections which are connected to the bearing shell shall not interfere with such removal of the chuck halves, the lower chuck half is provided with grooves 141, as shown in Fig. 10, to receive the inlet pipe section 80 of the high pressure oil line and the inlet and outlet pipe sections 97 and 98 of the water lines.

The bearing elements are preferably left on the roll necks during storage or grinding of the rolls. The gaps at 50 should then be closed by tightening up the nuts on studs 51 so that dirt may not enter therethrough, this relationship of the parts being illustrated in Fig. 13. Hence during grinding or storage, foreign matter cannot enter gap 50 to lodge on the oil retaining ring 46 or reach the bearing surfaces. If access to the bearings is desired for inspection, scrapping, etc., the bearing parts are so constructed as to permit ready access thereto. Each bearing shell 25 is made in halves separable on a horizontal plane with the halves suitably secured together as by bolts 150 (see Fig. 5), and rings 29 and 62 are also preferably made in halves and suitably bolted together, as are also the oil retaining rings 30, 63 and 64 carried thereby. Rings 47 and 100 and the oil retaining rings carried thereby, and ring 102, are similarly made in halves and rings 49 and 101 may also be made in halves if desired. When access is desired to the main half of the radial bearing the screws 27' and the screws or studs 51 (which are employed only in the bearing cap) are removed, and the bolts connecting the two halves of the bearing shell 25 must also be removed; the cap half of said shell may now be removed radially from the neck. Access may be gained to the thrust bearing, after removing nut 68, split ring 69 and collar 67, by removing screws 48 and separating the parts of the thrust bearing housing. Therefore all parts of the bearings are readily accessible as well as easily assembled and disassembled.

If the bearing elements are removed from the roll necks it is desirable that the radial bearing surfaces of the roll necks be fully protected throughout the period that the shells 25 are off of them. To this end each roll neck may be provided with a sleeve 152 as shown in Fig. 12, and which may be made as an integral sleeve or in halves suitably bolted together. Said sleeve should not only completely embrace the bearing portion 21 of the neck but also have flanges 153 and 154 which fit the shoulders at the opposite ends of each neck so that no opening is left for ingress of dirt, water, etc., to the bearing portion of the neck. The flange 153 may also be extended or provided with a tubular extension so as to fully protect the surface 22 on the roll neck. Said sleeve 152 may be suitably attached to the roll as by screws passing through the flange 153, or by means of a ring nut 155 when the sleeve or an interposed spacer extends over the neck portion 22 so that a nut may be mounted on the threaded collar 69 of Fig. 3, or an equivalent part. A collar 155' is provided for the lifting hook.

Fig. 16 illustrates a sleeve suitable for use with the outer roll neck, although it is apparent that the same character of sleeve can be used, with suitable change if necessary in dimensions, for the inner roll neck. Here the sleeve is shown as composed of two sections 163 and 164 respectively fitted to the diameters of the roll neck sections 20 and 22 and integrally united axially of the roll. While the sleeve may be made in one piece it is shown as split, provided with flanges 165 and adapted to be clamped about the roll neck with the flanges suitably secured together as by bolts. The sleeve is shown as held on the neck by a ring nut 155 as in the embodiment of Fig. 12. The sleeve section 164 may have a flange 166 provided thereon so that the cover 89 may be attached thereto when the roll is being stored, thereby protecting from injury the surface 167 which may be a finished true surface used for centering the roll in grinding. A collar 155' is provided for the lifting hook.

An alternative manner of mounting each bearing shell 25 in its chuck is shown in Figs. 14 and 15. As here shown each shell has engagement with its chuck through an arcuate fitted surface 157 which extends the length of the shell and which should be symmetrical in a circumferential direction with respect to the axial plane including the resultant of pressure. The fitted surfaces of contact are at the opposite side of the roll neck from the corresponding marking roll, and the remaining peripheral surface of the shell is free from the chuck as indicated at 156 in Fig. 14. Any suitable means may be employed for locking the shell in the chuck. As shown, the inner end of the shell has an overhanging arcuate ledge 158 for engagement with a corresponding groove in the inner end of the chuck, and a removable clip 159, detachably secured to the outer end of the shell as by screws 160, has an overhanging flange which interlocks with a flange 161 on the outer end of the chuck. Therefore the shell may be readily assembled with the chuck by axially sliding the chuck over the shell on the roll neck, after which the chuck is locked on the shell by the clip 159. The clearance left between the shell and the chuck affords provision for necessary expansion of the shell. This manner of supporting the shell is suitable where it is not necessary to provide relative tilting between the shell and the chuck in an axial direction, but provision for such axial tilting movement may also be suitably included as by employing a single axially-narrow surface of contact at 157—compare 25', Fig. 3, or the bearing shell may be designed to flex to the extent required by the flexure of the roll neck, as by providing axially spaced surfaces of contact with surface 157 as shown, when supported in this or in any other suitable way.

As heretofore pointed out, each roll neck may be provided, if preferred, with a sleeve for cooperation with the bearing shell to provide the radial oil film bearing. When such a sleeve is provided (as shown in Fig. 17) the sleeve may be water cooled. In cold rolling, the upper roll is sometimes heated, as by a gas flame, to change the contour of the working roll and thereby control the gauge across the sheet. Water cooling of the roll necks may be used to make this control more effective and to nicely regulate the same by varying the degree of cooling. This same effect is present to a less degree when the bearing shell 25 is cooled as heretofore explained, but when the neck itself is cooled by a water-cooled sleeve thereon, the rate of heat flow from the roll body to the neck, and therefore the change in contour to control the gauge, can be nicely regulated.

The water-cooled sleeve can be unitarily connected to the roll body or it may be free to creep circumferentially of the roll neck as herein explained. Referring to the embodiment shown in Fig. 17, which shows a shell for the outer roll neck, the roll neck is shown as machined to a uniform diameter and provided with a sleeve 170 which has a radial bearing surface 171 and a thrust bearing portion 172 on which is integrally formed or to which is suitably attached a flange or collar 173 to constitute the relatively rotatable element of the thrust bearing. Suitable thrust receiving elements (not shown) are designed to cooperate with the opposed faces of said collar 173 and the thrust bearing elements are designed to be enclosed in a housing which may be split for assembly about and disassembly from said collar as heretofore explained. Any suitable radial bearing shell, such for example as heretofore described, is also designed to cooperate with the radial bearing surface 171.

Sleeve 170 is shrunk on the roll neck but not keyed thereto, by preference, and it is therefore free to creep with respect to the neck. The sleeve may be expanded by hot fluid in the passages to be described, and shrunk and held on the neck by cold fluid in said passages. Sleeve 170 is suitably held against axial movement, as by a keyed lock washer 174 held in position by a ring nut 175 to which said washer may be bolted and threaded on such a ring as 69 heretofore described.

Sleeve 170 is suitably provided with a series of water passages 177 connected so as to provide for the to and fro flow of water lengthwise of said sleeve. One or more inlet passages 178 and one or more outlet passages 179 are provided in a demountable cap member 180 which may be bolted to the end of the sleeve as shown, with said inlet and outlet passages in communication with the passages 177. Said inlet and outlet passages communicate with suitable inlet and outlet connections 182 and 183, respectively, here shown as concentrically arranged and in communication through suitable stuffing boxes with stationary inlet and outlet water pipes. As the elements 178, 179 and 180 rotate with the sleeve, and elements 182 and 183 are stationary, said sleeve may rotate and creep without injury to the water connections afforded by the stationary inlet and outlet pipes.

The rate of flow of water through the sleeve 170 may be suitably controlled, manually or automatically as by a thermostatic control subjected to the temperature of the water or any other suitable source of temperature control, so that the gradient of heat flow from the roll body and the degree of heat abstraction can be nicely regulated to obtain the desired effects above referred to. A similar shell may be provided for the inner roll neck but suitably modified in view of the absence of a thrust bearing at this neck. The water-cooled necks and sleeves may be used with other suitable forms of bearings than heretofore described, but it is preferred to combine such water-cooled sleeves with radial oil-film bearings of the character above disclosed.

Referring now to Fig. 18 there is shown therein a bearing for the neck of a roll, in this case the neck which is also to receive the thrust bearing, which embodies a sleeve mounted on the roll neck, which may be water cooled if preferred as heretofore described in conjunction with the embodiment of Fig. 17, and which also embodies means of the character shown in Figs. 14 and 15 for retaining the bearing shell within its chuck.

As shown, the roll neck is provided with a sleeve 185 which is shrunk on the neck without the use of keys. Thereby the sleeve 185 may creep with respect to the roll neck, which it is likely to do, though very slowly, even if the sleeve is shrunk on the neck with considerable resulting pressure. The thrust collar 186 is mounted on or integrally secured to a second sleeve 187 which is keyed to the roll neck, said sleeve 187 being secured in position by a nut 188 threaded onto the end of the roll neck, preferably with the interposition of a collar 67 as heretofore described. Between the sleeve 185 and the shoulder 189 where the neck joins the roll body a hardened ring 190 is preferably interposed, and similarly a hardened ring 191 is preferably interposed between the sleeves 185 and 187. These hardened rings, being harder than the metal of the members in engagement therewith, tend to prevent seizure and to reduce the wearing which might otherwise take place when sleeve 185 creeps with respect to the roll neck.

The chuck, a portion of which is indicated at 192, is bored to receive the two halves of the bearing shell 193 and 194 respectively. The bearing selected for illustration is that of a lower roll, and therefore the lower half is water cooled as indicated and as described in detail in conjunction with Fig. 3. Particularly in the case of the bearing for the neck of the upper roll, where the weight of the parts is acting in the opposite direction from the resultant of the bearing pressure, it is necessary that the bearing shell portion 193 make a close fit with chuck 192 and be inseparable therefrom. In the bearing for the lower roll, gravity and the resultant of the bearing pressure are acting in the same direction and the bearing shell half is therefore pressed closely against the bore of the chuck, but the same construction is preferably employed for both upper and lower roll necks. To clamp the bearing shell against the chuck as has heretofore been described in conjunction with the schematic illustration of Figs. 14 and 15, the bearing shell halves are provided with an overhanging flange or extension 195, and the thrust bearing housing 196 is provided with a flange 197 which snugly engages the inner face of the extension 195. The outer periphery of the thrust bearing housing 196 has a sliding fit with the inner periphery of a ring 198 fitted into a recess 199 in the chuck 192, being retained in position in any suitable way as by the screws 200. At the inner end of the bearing, the halves of the bearing shell have an overhanging extension or flange 201 with which fits snugly the extension or flange 202 on a ring 203 which at its outer periphery has a sliding fit within the bore of a ring 204 that is fitted into a bore 205 in the chuck, ring 204 being suitably secured to the chuck as by the screws 206.

Bearing shell half 193 has a fitted surface of contact with the chuck 192 over a substantial arc, say 100°, which is preferably symmetrical with respect to the radial plane containing the resultant of the bearing pressure. Throughout the remainder of the circumference of the bearing shell the shell has a clearance with respect to the chuck as indicated at 207.

The thrust bearing housing is here shown as secured to the chuck by means of a ring 208 made in halves and preferably having interlocking engagement with the periphery of the thrust bearing housing as shown at 209. Ring 208 is secured to the chuck by suitable screws 210.

If the chuck is to be removed from the bearing shell, the bolts (not shown) which connect together the two halves of the ring 208 are first removed, and then screws 210 are removed, whereupon the two halves of the ring 208 may be removed radially. The chuck is then free to slide freely with respect to the bearing shell toward the end from which the ring 208 has been removed. As the fits between the engaging surfaces 211 are close, sliding can take place until the chuck is moved for a sufficient distance to disengage these surfaces—a distance of approximately 1¼" in the embodiment illustrated. Thereafter the chuck may be easily removed the remainder of the way, as the diameters are such that the fit is free between the bearing shell and ring 204 and between the bore of the chuck 192 and the periphery of the thrust bearing housing 196.

It will therefore be perceived that by this construction the half of the bearing shell toward which the resultant of the pressure is acting is firmly secured to the chuck along a predetermined arc of fitted surfaces, while the remainder of the shell is free with respect to the chuck. Therefore, as the bearing shell expands with increase of temperature, there is freedom for the shell to expand within the bore of the chuck without such restraint as would tend to cause the expansion to take place toward the neck of the roll, with the resultant danger of gripping between the bearing surfaces. At the same time the chuck may be readily removed from the bearing shell in the manner heretofore described.

This embodiment also illustrates the use of a pair of sealing rings 212 at the inner end of the roll neck as well as a pair of sealing rings 213 at the outer end of the thrust bearing housing as in the embodiment of Fig. 3. Also a pair of sealing rings 214 are shown between the radial bearing and the thrust bearing, so that the oil respectively used in a radial bearing and the thrust bearing may be kept separate if desired. This embodiment also illustrates the use of sealing rings 215 and 216 which extend around approximately one-half of the circumference of the radial bearing surfaces adjacent both opposite extremities thereof and at that side thereof which is opposite to that toward which the resultant of pressure is acting, in the same manner as the sealing ring 74 is used only adjacent the inner extremity of the radial bearing surfaces in the embodiment of Fig. 3. It will be apparent, however, that, if preferred, other arrangements of sealing rings may be employed in this construction, e. g., the character of sealing rings illustrated in Fig. 18 may be employed, in whole or in part, in connection with other embodiments if it is desired, for example, to keep the oil employed in the thrust bearing separate from that employed in the radial bearing, or if an additional sealing ring is found desirable at the inner end of the radial bearing surfaces, etc.

While Figs. 14, 15 and 18 illustrate bearings for the necks of lower rolls, it is to be understood that the bearings for the necks of the upper rolls may be similarly constructed, but with the parts inverted as heretofore explained so that the fitted surfaces of engagement between the bearing shell and the chuck are at the upper portion of said shell, i. e., so that the resultant of pressure acts toward said fitted surfaces and said fitted surfaces are symmetrically arranged with respect to the radial plane including the resultant of pressure. With the parts so inverted, the clips 159 of Figs. 14 and 15 which secure the fitted surfaces of the bearing shells and the chucks together must have sufficient strength so as to support the weight of the roll, because when the upper roll is not in operation its weight and the weight of the elements mounted on its necks are carried by the said clips 159. Similarly in the embodiment of Fig. 18 the weight of the roll and the elements mounted on its necks is sustained by the flanges or extensions 197 and 202 of the members 196 and 203 respectively, and said flanges must have sufficient strength to sustain this weight.

Referring now to the embodiment of Figs. 19 and 19a the bearing for the roll neck is again of the type wherein a fitted surface on the bearing shell is clamped against a fitted surface on the chuck, as in the embodiments of Figs. 14, 15 and 18, this embodiment also being shown as including a sleeve on the roll neck as in the embodiment of Fig. 18. As the embodiment of Figs. 19 and 19a is in many respects similar to the construction illustrated in Fig. 18, the same reference characters are employed for corresponding parts except as respects the features now to be described. As in the embodiment of Fig. 18 the bearing is shown as for that end of the roll which is also to carry the thrust bearing, but in both cases, as heretofore explained, a similar construction without the use of a thrust bearing would be employed for the neck at the opposite end of the roll, as explained in conjunction with Figs. 3 and 4.

In place of the hardened ring 190 of Fig. 18, the embodiment of Figs. 19 and 19a employs a prestressed ring 220 which comprises a flange 221 adapted to be gripped between the sleeve 185 and the shoulder 189 on the roll. Said ring also has an intermediate portion 222 which may vary in shape according to the configuration of the roll-end but which provides a flat radially directed surface 223 adapted to bear against the end face 224 of the roll. Said ring is also provided with an angularly directed portion 225 which is grooved and carries an oil retaining ring 226.

Fastened to the bearing shell 193, as by screws 227, is a ring 228 shown as centered on the end of the bearing shell by the engagement of shoulders 229 and 230 on said shell and ring respectively. Ring 228 is generally U-shaped in cross section, and its inner leg 231 is recessed to receive an oil retaining ring 232 which is pressed by coil springs 233 into engagement with a flat radial surface 234 provided on the ring 220. The outer leg 235 of said ring 228 provides a cylindrical surface 236 with which the oil retaining ring 226 is in rubbing engagement. Ring 220, being clamped between the sleeve 185 and the end of the roll, rotates with the roll, while ring 228, being attached to the bearing shell, is stationary. Oil retaining ring 232 can slide axially to maintain its oil sealing contact with the surface 234 while ring 226 can slide axially with respect to surface 236 so as to maintain an oil sealing contact therebetween.

Ring 220 is made of resilient metal and so shaped that it is tensioned when clamped at its flange 221 between the sleeve 185 and the shoulder 189 with the radial portion 223 bearing against the end 224 of the roll. Thereby a tight contact between said ring 220 and the roll end is maintained to prevent water and dirt from entering between the surfaces 223 and 224. If the sleeve 185 should shrink away from the shoulder 189, the sealing contact between the surfaces 223 and 224 is still maintained owing to the tension in the ring 220 which will cause the flange 221 to follow the receding sleeve 185 while still maintaining the contact between the surfaces 223 and 224. At the same time sealing contact is maintained between the sealing ring 226 and surface 236 and between the sealing ring 232 and surface 234 so that water and dirt may not reach the oil in the annular cavity 237, while relative movement in an axial direction may take place between the rings 220 and 228 without interrupting said sealing contacts.

In place of a sleeve 185 shrunk on the neck, the sleeve may make a loose fit therewith and be otherwise retained thereon as by a nut on the end of the neck as heretofore explained, but the rings 220 and 228 will still operate in the same manner as just explained. In either event the ring 220 permits the maintenance of a joint which will prevent the ingress of dirt and water while avoiding rings which require attaching means that involve the drilling of holes into the body of the roll or the neck and which may be objectionable because of the consequent weakening of these parts at a location which is highly stressed. This construction also possesses the advantage that the maintenance of the sealing contacts is assured even though there may be small errors in the machine work which would otherwise interfere with the obtaining of such contact between the parts as to assure against ingress of water and dirt. By the present invention the ring 220 may be so formed as to correspond with the shape of the end of the roll and the associated parts, and maintain the desired surfaces in contact as effectively as if the parts were made integral or rigidly attached, but with the advantage that relative movement is provided for and errors in machine work compensated for in a simple and effective manner.

The embodiment of Figs. 19 and 19a also includes a somewhat different construction for securing the bearing shell to the chuck at arcuate fitted surfaces of contact from what has heretofore been illustrated and described in conjunction with the embodiments of Figs. 14, 15 and 18. As here shown, the inner end of the bearing shell is provided with a radial extension 239 having an outwardly directed flange 240 which fits at its inner cylindrical surface with the outer peripheral surface on a flange 241 on the chuck, so that the fitted surface on the bearing shell 193 is clamped securely against the corresponding fitted surface on the chuck by the interlocking engagement of said flanges 240 and 241.

At its outer end, the chuck is provided with a recess 242 in which is engaged the flange 243 of a ring 244, the outer periphery of said flange 243 having a fitted surface of contact with the inner cylindrical surface 245 of said recess. Ring 244 has a radially extending portion 246 by which it is suitably secured to the chuck, as by screws 247, and said ring 244 is also provided with a second flange 248 which has its inner cylindrical surface fitted to the peripheral surface 249 of the thrust bearing housing 250. Bearing shell 193 is provided at its end with a radial extension or flange 251, and thrust bearing housing 250 is provided with an extension 252 which has its cylindrical surface 253 in fitted engagement with the inner cylindrical surface of said flange 251. The thrust bearing housing 250 is secured to the chuck by a split ring 254 (corresponding to ring 208 of the embodiment of Fig. 18) which has interlocking engagement with the periphery of the thrust bearing housing 250 as shown at 255 and is secured to the chuck by screws 256. Thereby the bearing shell 193 is securely clamped to its chuck 192 along their fitted surfaces of engagement by reason of the fitted surfaces between flanges 240 and 241, at the inner end of the bearing shell, and by reason of the fitted surfaces between flange 251 and the extension 252 of the thrust bearing housing 250, and between the periphery 249 of the said housing and the flange 248 of ring 244 secured to the chuck, at the outer end of the bearing shell. It will be noted that ring 244 performs the function of ring 198 in the embodiment of Fig. 18. Ring 244 may be made integral with the chuck if a diameter at 249 smaller than the bore of the chuck is not desired.

The embodiment of Figs. 19 and 19a shows a bearing for a lower roll, but it will be understood that the same construction may be employed for the upper roll but with the bearing shell inverted as heretofore explained. In a bearing for an upper roll the weight of the roll and the bearing elements carried on its necks is sustained by the flanges or extensions 251 and 240 at each bearing, when the mill is not in operation. In either event the ring 244 secures the housing 250 to the chuck in proper centered relationship to clamp the bearing shell to the chuck, as does the ring 198 of the embodiment of Fig. 18. As in the embodiment of Fig. 18, the fitted surfaces at 249 are relatively narrow in an axial direction, so that when the chuck has been moved axially toward the end of the roll for a short distance, sufficient to disengage the surfaces at 249 (after the ring 254 has been removed), the chuck may be then freely removed from the bearing shell because of the loose fit existing between the periphery of the bearing shell and the bore of the chuck and the remainder of the ring 244. As in the embodiments of Figs. 14, 15 and 18, a substantial clearance, indicated for example at 258, may be provided between the bearing shell and the chuck except over the fitted areas of contact toward which the resultant of pressure is acting as heretofore explained.

In each of the embodiments shown in Figs. 14, 15, 18, 19 and 19a, therefore, ample clearance may be provided for the radial expansion of the shell so that danger of the shell expanding axially to squeeze the end of the roll, by reason of insufficient opportunity for radial expansion, may be entirely avoided.

The embodiment of Figs. 19 and 19a employs a semi-circular seal ring, 215 and 216, at each end of the radial bearing surfaces on that arc of the bearing surfaces which is remote from the arc toward which the resultant of pressure is acting, as in the embodiment of Fig. 18. In the case of the bearings for the upper roll, the semicircular seal rings are on the lower side of the bearing surfaces, and when the mill is not in operation the weight of the roll and the parts carried on its necks presses the semicircular seal rings into close contact with the bearing surfaces on the roll necks and minimizes the escape of oil by leakage from the bearing surfaces at the lower half of each bearing. At the same time, however, the upper halves of the bearing surfaces, which are pressed into engagement by the resultant of pressure during operation of the mill, may now separate somewhat so that oil may escape therefrom when the mill is not in operation. This may be partly remedied by extending the partial rings 215 and 216 for a greater arc of contact with the bearing surface on the roll neck, say for 240° of bearing surface instead of from 180° of bearing surface, or if free communication of oil flow is desired between the radial and thrust bearing surfaces, this construction may be employed at the inner end of the radial bearing only. This extra arc of contact will tend to hold the oil against leakage through those portions of the bearing surfaces that are cut away to act as oil channels as heretofore described. A full ring could also be used around 360° of bearing surface at either or both ends of the radial bearing, said ring being mounted to float with respect to the bearing, but fitting closely its retaining groove as well as the radial bearing surface so as to minimize the escape of oil from the radial bearing surfaces in all relative positions thereof. Also the bearing shell half on the relatively unloaded side of the bearing may be mounted to move with respect to the main shell half, i. e., the half on the loaded side of the bearing when the mill is in operation, as hereinafter explained in conjunction with the embodiment of Figs. 20 to 22 inclusive.

Referring first to Figs. 20 and 21 which show a bearing for a lower roll, also illustrated as a bearing for an outer neck which is to include a thrust bearing although as heretofore pointed out in conjunction with Figs. 3 and 4, a similar construction would be employed at the inner neck but without a thrust bearing, the bearing shell is made in halves as heretofore explained, with the halves secured together by bolts 259 passing through lugs on the cap 260, i. e., the half which is not loaded when the mill is in operation, and into the main or normally loaded portion 261 of said shell. The construction here illustrated is applied to a two-high mill, instead of a four-high mill as in the embodiment of Figs. 1 to 10 inclusive, but it is to be expressly understood that the invention as here illustrated may be equally employed in conjunction with a four-high mill, in the same manner as the earlier described construction can be applied as heretofore pointed out to a two-high or other type of mill. Either half or both halves of the bearing shell may be water cooled as indicated by the cooling passages 262 diagrammatically shown by dotted lines.

Main bearing shell 261 is suitably retained in a chuck 263, and at its inner end a ring or housing member 264 is suitably attached to the main bearing shell 261, as by screws 265, and has oil retaining rings 266 and 267 which cooperate with circumferential and radial surfaces on the neck of the roll. At its opposite end, in the form shown, a thrust bearing housing in the form of a ring 268 is suitably attached to the main bearing shell, as by screws 269, said housing being closed by an end plate or annular disk 270 suitably attached to the housing ring 268, as by screws 271. The reduced portion 272 of the roll neck is provided with a sleeve 273 which is suitably keyed thereto, as shown at 274, said key preferably extending for only a portion of the axial length of the neck section 272, for a reason hereinafter explained, as is also illustrated in the embodiments of Figs. 18, 19 and 19a. Formed on or suitably attached to the sleeve 273 is a thrust collar 274a, and cooperating with the opposed faces of said thrust collar are thrust bearing elements 275 of any suitable character and construction and supported in the bearing housing in any suitable way. In this embodiment the thrust bearing elements are shown as disposed only in the lower portion of the thrust bearing housing, i. e., in cooperation with that portion of the thrust collar which is adjacent that side of the radial bearing surfaces toward which the resultant of pressure is acting, an arrangement which may be employed in conjunction with other embodiments of the invention when appropriate in view of the magnitude and arrangement of the pressures to be received. The embodiment of Fig. 20 also employs a ring 67 which is clamped against the end of the sleeve 273 by a nut 276, and if desired a dowel 277 may pass through said disk 67 and engage in a recess in the plate 270 to prevent relative rotation between the parts, as has been illustrated in some of the other embodiments. It will be noted that as in other embodiments the radial and thrust bearing elements are designed to constitute a unit with the roll for assembly and disassembly. In this embodiment, as shown in Fig. 21, the bearing shell half 261 is in contact with the chuck 263 through an angle of substantially 180°, although this may be varied within considerable limits, while the cap portion 260 of said shell has a substantial clearance as respects the surrounding structure, as shown at 280 in Fig. 20.

In order to retain the oil in contact with the radial bearing surfaces, the cap half 260 of the bearing shell is made somewhat shorter in an axial direction than the main half 261, as clearly shown in Fig. 20 and the oil is retained in the radial bearing by a cover composed of lateral members 281, end members 282 which are generally rectangular in outline but have a semicircular opening adapted to embrace the cap, and a closure plate 283 which may be suitably attached to said lateral and end members, as by welding. Said cover member is held in position in any suitable way. As shown, each of its lateral members 281 is provided with a recess 284 and a clamping plate 285, suitably secured to the chuck 263 as by screws 286, engages in each corresponding recess 284 to hold the cover member against the main portion 261 of the bearing shell. The retaining means for the cover also assists in retaining the main portion of the bearing shell in its seat in the chuck as is apparent from Fig. 21.

In the case of the bearings for the lower roll, the weight of the roll and parts supported on its necks acts in the same direction as the resultant of the pressure when the mill is in operation, i. e., downward, and it is unnecessary that the shell cap be resiliently urged into bearing engagement with the roll neck, although if preferred the same construction as next to be described in conjunction with the upper roll may be used with the lower roll. For example, it may be desirable, as heretofore referred to, to water cool both the shell cap and the body of the shell, and in order that they may properly and efficiently conduct heat from the roll neck, both the shell cap and the body of the shell should be in continuous engagement with the radial bearing surface of the roll neck. Under such circumstances a resiliently operated shell cap that could yield upon expansion of the roll neck and remain in contact with the cylindrical bearing surface on the roll neck during contraction so as to keep in continuous contact therewith would be desirable.

Whereas in the case of the bearings for the lower roll gravity and the resultant of pressure when the mill is in operation act in the same direction, in the case of the bearings for the upper roll gravity and the resultant of pressure act in opposite directions. Therefore, it is desirable that each shell cap for the bearings of the upper roll be urged into contact with the radial bearing surfaces of the roll necks (it being remembered that the structure is relatively inverted for the bearings of the upper roll) with a force that compensates for the downward action of gravity. Fig. 22 corresponds with Fig. 21 but shows the bearing applied to the neck of the upper roll, all parts being the same as in Fig. 21, and given the same reference character, but relatively inverted, with the exception of the resilient means to be described.

As here shown coil springs 287 are interposed between the heads 288 of the bolts 259 and the washers or sleeves 289 on said bolts which transmit the pressure of said springs to the shell cap.

Said springs are set up with initial tension such that the shell cap is pressed upwardly with a pressure equal to twice the weight exerted by the roll neck on said cap, so that said springs not only overcome the effect of gravity but press the roll neck against the main bearing shell half 261 with the same pressure with which the lower roll neck presses against its main bearing shell. Thereby, owing to the presence of equal pressures, like oil films are created both initially and during the operation of the mill. As shown in Fig. 22 a small clearance is left between the bearing shell cap and the main portion of the bearing shell at 290, so that said cap is resiliently urged into engagement with the roll neck at all times. If preferred, however, the cap can be normally in engagement with the body of the bearing shell when the parts are all of the same temperature and when a predetermined running clearance of small amount exists between the radial bearing surfaces of the neck and the bearing shell. In this event the springs will come into action only when the thickness of the oil film becomes great enough to open the joint between the shell cap and main bearing shell or when the differences in temperature cause the roll neck to exceed in diameter the normal bore of the shell cap and main bearing shell. Either arrangement may be used in either or both of the bearings for the upper and lower rolls, depending upon the operation desired.

Where, as in the construction just described, the upper roll neck is initially pressed into engagement with its bearing shell with the same pressure as exists between the neck of the lower roll and its bearing shell, the entry of the stock between the rolls is productive of no shock or reversal of pressure at the bearings. This construction therefore overcomes the difficulty arising from the freedom that exists, particularly in the bearings for the upper roll, owing to the necessary clearance to take care of the expansion of the roll neck and bearing parts during operation.

The foregoing construction, particularly as illustrated in Fig. 22, is especially advantageous for the water cooling of the necks of mill rolls, both for upper and lower rolls, for rolls of four-high mills, two-high mills, etc. By this construction both the cap and the main body of the shell may be provided with cooling passages, and maintained in continuous heat-transmitting relation with the neck, owing to the resilient actuation of the shell cap, and this is true both when the mill is stationary and when the mill is in operation. Thereby both sides of each roll neck are cooled to approximately the same degree when the rolls have come to rest, with little or no tendency for the roll neck to warp because of non-symmetrical cooling. When the mill is out of operation the cap and the body of the shell are practically in metal-to-metal contact except where oil grooves or passages may be cut in the bearing surfaces. Only a very thin oil film then exists between the bearing surfaces and the thinner the film the more effective is the water cooling. When the mill is in operation the need for supplying cooling water to both the cap and the main portion of the bearing shell is less important, as the tendency for the roll neck to warp under non-symmetrical cooling is materially less. Hence the cooling of the shell cap may be omitted during operation except when the cooling effect is desirable to supplement the cooling of the main portion of the bearing shell, as for example at high speeds.

Thereby the resilient urging of the shell cap into contact with the neck performs an important function in that the desired cooling effects may be obtained in addition to permitting expansion and contraction of the roll neck without binding, a result that cannot be secured with the ordinary cap because the running clearance will ordinarily keep the cap out of contact with the roll neck when the rolls are pressing against the main bearing shell half because of the need for a large clearance in the absence of a provision permitting the shell to increase its bore as the roll neck expands upon increase of temperature.

In the construction illustrated in Fig. 20 a semi-circular oil retaining ring 291 is provided between the inner end member 282 of the cover and the unloaded half of the radial-bearing surface on the neck. If preferred, a similar ring may also be used at the outer end member 282, so that there are arcuate oil retaining rings at both ends of the radial-bearing surface as illustrated in the embodiments of Figs. 18, 19 and 19a, or as illustrated in Fig. 20 and as embodied in the construction of Figs. 1 to 10, the thrust bearing housing may be in open communication with the interior of the radial bearing owing to the omission of an oil retaining ring at the outer end of the radial-bearing surface. When as in the constructions of Figs. 18, 19 and 19a, an oil retaining ring is employed at the end of the radial-bearing surface adjacent the thrust-bearing housing, the oil for the lubrication of the thrust-bearing surfaces may be provided solely by the leakage of oil past said oil retaining ring. In these constructions as illustrated, the thrust-bearing elements are disposed at the lower portion of the thrust collar and the lubrication thereof by oil leaking from the radial-bearing surfaces is sufficient. The outlet for the oil from the thrust-bearing housing may be made as low as desired so long as the thrust-bearing surfaces are properly immersed, and the lower the head of oil existing in the thrust-bearing housing, the less is the tendency of the oil to escape from said housing by leakage. The bearing of Figs. 20, 21 and 22 may be lubricated by low-pressure oil inasmuch as in the case of a two-high mill both rolls are positively driven and the use of high-pressure oil for the radial bearings is of less importance than in the case of a four-high mill, but if preferred, high-pressure oil may also be used for the two-high mill.

In the embodiments of Figs. 18 to 22 inclusive the key by which the thrust bearing sleeve is retained on the neck, 274 in Fig. 20 and 292 in Figs. 18 and 19a, extends for only a part of the axial length of said neck so as to leave a substantial portion of uninterrupted cylindrical surface indicated as a bearing surface at 293 in Fig. 23. Thereby this portion of the neck may be used to support the roll for grinding or turning thereof, a steady rest being schematically indicated at 294 and a hold-down at 295. As it is preferred that the bearing shell be retained on the radial-bearing surface of the roll neck during grinding and turning as well as during storage, means are preferably provided to prevent the radial-bearing shell 296 from moving axially off of the radial-bearing surface 297. As shown, a retaining plate 298, which may be an annulus slipped over the neck portion of smaller diameter or which may be made in halves if preferred, is suitably attached to the neck, as by screws 299. Said plate is so formed for cooperation with opposed surfaces that it also protects the outer end of the radial-bearing surfaces from ingress of dirt thereto, and means such as usual seals may also be provided between the end of the roll and the inner end of the bearing shell 296 to prevent ingress of dirt at this joint. Where the bearing shell is of the construction shown in the embodiments of Figs. 20 to 22, the shell cap itself may also be used as a hold-down in a lathe, so that the roll may be rotatably supported on oil films provided by its radial bearings, as heretofore explained, where the roll support which is bolted to the carriage or bed of the lathe is of the general character indicated by the chuck 263 in Figs. 21 and 22, in which case the hold-down in the lathe could directly engage the shell cap, through a set screw or clamping plate for example. In place of rest 294 a saddle for the shell may be used, as indicated in dotted lines in Fig. 23. Hold down 295 may also engage any other suitable surface on the neck.

It will therefore be seen that by the present invention, each roll of a rolling mill is provided at each neck thereof with a radial oil-film bearing which is adequately lubricated and cooled.

The film produced between the cylindrical surfaces which constitutes the radial bearing avoids the difficulties incident to the use of antifriction bearings as heretofore pointed out, and the change in thickness or pressure of the film with change of roll speed can be used to compensate for the change in reduction of the material being rolled incident to such change in roll speed. By preference, however, high-pressure oil is used as heretofore explained, and this may be introduced before starting to form a proper oil film between the radial-bearing surfaces and thereby reduce the friction and wear heretofore incident to starting, or it may be used to supplement the pressure normally generated by the oil film so as to predetermine the film thickness existing in the radial bearings and thereby compensate, as heretofore explained, for the tendency of the gauge of the material being rolled to change under varying speed, or it may be used for both purposes.

Provision has also been made for the adequate cooling of the bearings, and the cooling effect may be automatically controlled as heretofore explained, so that the desired oil viscosity will be maintained and heat either passing to the bearings from the rolls or generated by friction in the bearings properly removed. The proper cooling of the bearing shells assures that the heat of friction is abstracted and withdrawn promptly from the oil and shell, and therefore uncontrolled decrease of viscosity that facilitates leakage as well as impairs the lubricating action is thus avoided.

The present invention also affords roll-neck bearings which are economical in the use of oil. Unless high-pressure oil is used to compensate for variations in film pressure under variations of speed, it is necessary only to keep such a head on the oil supplied to the bearings as to assure that the bearing cavities are filled with oil. Leakage of oil past the oil-retaining rings is therefore reduced to a minimum, while the present invention provides for the reuse of the greater part of such leakage oil by protecting it from contamination.

All parts of the bearing and its associated parts are readily accessible for inspection and repair. The parting of the chucks on a horizontal plane gives ready access to both the radial and thrust-bearing members and also permits assembly and disassembly without injury to the bearing parts. The bearings are preferably retained on the roll necks during grinding and storage, but if removed adequate protection for the bearing surfaces has been provided. If the grinding or turning of the roll bodies is effected while the rolls are supported on the radial bearings provided by this invention, the grinding or turning takes place while normal oil films are formed between the radial bearing surfaces, and therefore concentricity, so essential to maintenance of proper gauge, is obtained. However, provision has also been made whereby the roll may be readily supported for grinding or turning independently of the radial bearings and without removal of the elements thereof.

Either half of the bearing shell may be removed from the shell neck independently of the other half and of the thrust-bearing housing or corresponding parts owing to the construction employed, and this is of particular importance in permitting the loaded half of the bearing shell to be separately removed and replaced, a feature that is highly useful when fitting of the bearing surfaces under load is required. Moreover the bearings of the present invention may be readily standardized so that they may be transferred from one roll to another and be used on new rolls after other rolls have worn out.

In the embodiment of Figs. 1 to 10, each bearing shell 25 is tiltably mounted at 42 so that it may properly aline itself with its neck under such deflection therein as occurs in practice and this tilting action is obtained without undue restraint by the thrust-bearing parts or the elements for retaining the bearing on the opposite neck of the roll. At the same time a single thrust bearing sustains all of the axial thrust on the roll and transmits it directly to the chuck and housing of the mill without interfering with the proper action of the radial-bearing shell. The thrust bearing holds one end of the roll against axial movement, but the roll is otherwise free to expand and adjust its length because of ample clearance between the ring 102 and groove 103 (Fig. 4), thereby avoiding the opposition to expansion and adjustment incident to the use of thrust bearings at both ends of each roll as heretofore used with antifriction or roller bearings. The bearing shells in this embodiment are normally independent of the housing for the thrust bearing and the corresponding elements at the inner roll neck, thereby affording ample opportunity for relative expansion as well as the tilting of the bearing shells to conform to the deformation at the roll-necks without interference from the thrust bearing housing or corresponding parts.

The present invention also provides a roll neck bearing which may be rigidly clamped to its chuck or other supporting member along a limited area where the resultant of pressure is acting, and at the same time adequate clearance may be provided for the major portion of the circumference of the radial bearing shell so that the neck and shell may expand under the temperature existing during operation without danger of the parts gripping or the expansion being enforced in a direction that may cause interference with the proper operation of the roll or the bearing parts. Provision has also been made whereby both upper and lower roll necks may be held in contact with their bearing shells at the normally loaded side thereof with equal pressure, and therefore the introduction of stock into the mill is accompanied only by a substantially equal increase in pressure in the same direction as that in which the pressures are already acting.

The present invention also permits sleeves on the roll necks to be dispensed with, although such sleeves may be employed if preferred. Such sleeves are apt to creep and if there is any lack of concentricity, such creeping causes the roll to run out of true. Hence omission of such sleeves facilitates maintenance of accurate gauge during the life of the roll. If used, however, the sleeves may be water cooled as heretofore illustrated, and if concentric they can be permitted to creep without interference with the cooling. Cooling passages in such a sleeve may also be used to facilitate installation and removal thereof by passing hot water or steam therethrough to expand the sleeve with respect to the roll neck.

Provision has also been made whereby the roll with its bearing elements may be moved as a unit into and out of operative position without exerting strain on the bearing elements associated with the roll necks. Furthermore, improved means have been provided whereby leakage of oil from the radial-bearing surfaces may be reduced to a minimum and whereby ingress of water and dirt to the bearing surfaces during operation of the mill has been reduced to a minimum.

It will therefore be perceived that improved bearings for the necks of the rolls of a rolling mill have been provided which fulfill each and all of the several objects heretofore set out. While a few embodiments of such improved bearings have been illustrated and described with considerable particularity it is to be expressly understood that various other expressions of the invention may be employed. Other constructions and arrangements of the thrust-bearing housing and its manner of assembly and association with the chuck and the radial-bearing elements may be used, other forms of thrust bearing may be employed, other forms of radial-bearing elements and of mounting means therefor may be used, other systems for supplying lubricant or for cooling the parts may be substituted, other forms of oil retaining rings may be employed, etc. Certain features of the invention may also be used without others, features shown in conjunction with one or more embodiments may be employed in conjunction with other embodiments and changes may be made in details of construction, arrangement, proportion, material, etc., without departing from the present invention. Reference is therefore to be had to the appended claims for a definition of the limits of the invention.

What is claimed is:

1. In rolling-mill practice, mounting the roll necks on radial oil-film bearings and compensating for the tendency for changes in roll speed to change the gauge of the rolled material by changes in the thickness of the oil film between the relatively rotatable bearing members of the rolls.

2. In rolling-mill practice, mounting the roll necks on radial oil-film bearings and forming such oil-films between the relatively rotatable bearing members that the changes in oil-film thickness produced automatically by changes in speed of the relatively rotatable bearing members cause the rolls to move toward and away from each other in inverse proportion to the change in gauge otherwise produced by the change in roll speed.

3. In rolling-mill practice, mounting the roll necks on radial oil-film bearings, and controlling the oil films in said bearings so that changes in oil-film thickness accompanying changes in the operating conditions of the mill compensate for the changes of gauge otherwise accompanying said changes in condition.

4. In rolling-mill practice, mounting the roll necks on radial oil-film bearings, introducing oil under pressure into said bearings, and maintaining such a pressure on said oil that the changes in oil-film thickness during changes in speed between the relatively rotatable bearing members compensate for the changes in gauge otherwise accompanying said changes of roll speed.

5. In rolling-mill practice, mounting the roll necks on radial oil-film bearings, introducing oil under pressure into said bearings, and varying the pressure on said oil with changes in the speed of the rolls inversely to said changes in speed to compensate for the changes in gauge otherwise produced by the changes in roll speed.

6. In rolling-mill practice, mounting the roll necks on radial oil-film bearings, introducing oil under pressure into said bearings, and varying the thickness of the oil films by such an amount that the changes in oil-film thickness compensate for the changes in gauge otherwise accompanying the changes in roll speed.

7. In rolling-mill practice, mounting the roll necks on radial oil-film bearings, cooling the oil films, and varying the cooling effect to control the viscosity of the oil so that the changes in gauge otherwise accompanying changes in roll speed are compensated by changes in the oil-film thickness.

8. In rolling-mill practice, mounting the roll necks on radial oil-film bearings, cooling the oil films, and so varying the cooling action that the changes in oil-film thickness automatically produced by changes in roll speed may compensate for the changes in gauge otherwise accompanying said changes in roll speed.

9. In rolling-mill practice, mounting the roll necks on radial oil-film bearings, cooling the oil films, and simultaneously controlling the pressure in said films and the cooling of said films so that the resultant changes in oil-film thickness during changes in roll speed compensate for the changes in gauge otherwise accompanying said changes in roll speed.

10. In rolling-mill practice, mounting the roll necks on radial oil-film bearings, introducing oil under pressure into said bearings, cooling said bearings to control the viscosity of the oil in the oil films thereof, and varying the oil pressure and cooling effect with the changes of roll speed sufficiently to compensate for the changes in gauge otherwise accompanying said changes in roll speed.

11. In rolling-mill practice, mounting the roll necks on radial oil-film bearings, introducing oil under pressure into said bearings, varying the pressure on said oil inversely with changes in the roll speed, cooling the oil films, and maintaining such a relationship between the temperature and pressure of said oil films that the oil-film thickness changes with changes in roll speed by an amount sufficient to substantially compensate for the changes in gauge otherwise accompanying said changes of roll speed.

12. In rolling-mill practice, mounting the roll necks on radial oil-film bearings, supplying said radial bearings with lubricating oil, forming radial oil films between the relatively rotatable bearing members of said rolls to sustain the pressures exerted on said rolls when in operation, and variably cooling said oil films to control the thickness thereof under changes in the conditions of operation of the rolls.

13. In rolling-mill practice, mounting the roll necks on radial oil-film bearings, supplying said radial bearings with lubricating oil, forming radial oil films between the relatively rotatable members of the bearings of said rolls, cooling said oil films to control the viscosity of the oil, and automatically controlling the temperature of the cooling medium to control the temperature of said oil films and predetermine the thickness thereof.

14. In rolling-mill practice, mounting the roll necks on radial oil-film bearings, supplying said radial bearings with lubricating oil, forming radial oil films between the relatively rotatable members of the bearings of said rolls, cooling said oil films to control the viscosity of the oil, introducing oil under pressure to vary the thickness of said oil films, and automatically controlling the introduction of said high-pressure oil from the temperature of the cooling medium to maintain oil films of predetermined thickness between said bearing surfaces.

15. A radial oil-film bearing for roll necks comprising a bearing shell surrounding the neck of a roll and having a cylindrical bearing surface cooperating with a cylindrical surface on the neck to form an oil film therebetween, a chuck in which said bearing shell is mounted, and a block engaging said shell and mounted in an aperture of said chuck, said block having supporting means with respect to which said block may tilt whereby said shell may tilt axially within said chuck.

16. A radial oil-film bearing for the necks of rolls journaled in mill housings, comprising a bearing shell surrounding the neck of a roll and having a cylindrical bearing surface cooperating with a cylindrical surface on the neck to form an oil film therebetween, a chuck surrounding said bearing shell and provided with an aperture therein, a block in said aperture interengaged with said shell and restraining said shell against improper displacement, said block projecting through said aperture and having bearing means in engagement with means on the housing adapted to tilt with respect thereto whereby said shell is supported in said chuck for tiltable movement axially of the roll to maintain alinement of said bearing surfaces.

17. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, and exteriorly supported means projecting into said chuck and tiltably supporting said bearing shell within said chuck for axial movement of said shell with respect to said chuck.

18. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, means tiltably supporting said bearing shell for axial movement of said shell with respect to said chuck, and means between said shell and chuck at the opposite side of said shell from said tiltable support for centering said shell with respect to said chuck but leaving said shell free to move tiltably with respect to said chuck.

19. A radial oil-film bearing for roll necks, comprising a bearing shell surrounding the neck of a roll and having a cylindrical bearing surface cooperating with a cylindrical surface on the neck to form an oil film therebetween, said bearing shell being eccentric with respect to the axis of the neck and having the thicker portion thereof at the side of said neck toward which the resultant of pressure is acting, a chuck in which said bearing shell is mounted, and means projecting through said chuck into cooperative relationship with the thicker side of said shell for mounting said shell to tilt axially of the roll.

20. In a radial oil-film bearing for roll necks, a bearing shell surrounding the neck of a roll and having a cylindrical bearing surface cooperating with a cylindrical surface on the neck to form an oil film therebetween, said bearing shell being eccentric with respect to the axis of the neck and having the thicker portion thereof at the side of said neck toward which the resultant of pressure is acting, cooling means disposed in the thicker portion of said shell, a chuck in which said bearing shell is mounted, and means projecting through said chuck into cooperative relationship with the thicker side of said shell for mounting said shell to tilt axially of the roll.

21. In a radial oil-film bearing for roll necks, a bearing shell surrounding the neck of the roll and having a cylindrical bearing surface cooperating with a cylindrical surface on the neck to form an oil film therebetween, said bearing shell being eccentric with respect to the axis of the neck and having the thicker portion thereof at the side of said neck toward which the resultant of pressure is acting, cooling means disposed in the thicker portion of said shell, said cooling means comprising a plurality of axially extending passages in said shell and communicating grooves formed in the end faces of said shell and connecting said axially extending passages into a continuous zigzag conduit, a chuck in which said bearing shell is mounted, and means projecting through said chuck into cooperative relationship with the thicker side of said shell for mounting said shell to tilt axially of the roll.

22. In a radial oil-film bearing for roll necks, a bearing shell surrounding the neck of a roll and having a cylindrical bearing surface cooperating with a cylindrical surface on the neck to form an oil film therebetween, a plurality of oil-retaining rings cooperating with surfaces on the neck, said rings including one or more arcuate rings cooperating with the rotatable bearing surfaces on the neck at only the low-pressure side thereof to restrict escape of oil where the clearance between the bearing surfaces is greatest.

23. In a radial oil-film bearing for roll necks, a bearing shell surrounding the neck of a roll and having a cylindrical bearing surface cooperating with a cylindrical surface on the neck to form an oil film therebetween, oil-retaining rings cooperating with surfaces on the neck and adapted to confine oil between said bearing surfaces, said rings including a pair of spaced rings at the same end of the bearing surfaces, means for introducing oil to said bearing surfaces, and means communicating with the space between said pair of oil-retaining rings and adapted to collect the relatively clean oil that escapes from said bearing surfaces.

24. In a radial oil-film bearing for roll necks, a bearing shell surrounding the neck of a roll and having a cylindrical bearing surface cooperating with a cylindrical surface on the neck to form an oil film therebetween, oil-retaining rings cooperating with surfaces on the roll neck and adapted to confine oil between the bearing surfaces, means for introducing oil to said bearing surfaces, means communicating with the bearing surfaces inside of said oil-retaining rings and adapted to collect the relatively clean oil that escapes from said bearing surfaces, and means for collecting oil which escapes past said oil-retaining rings and keeping the same separate from said relatively clean oil.

25. Radial oil-film bearings for the necks of a roll, each of said bearings comprising a bearing shell surrounding a neck and having a cylindrical bearing surface cooperating with a cylindrical surface on said neck to form an oil film therebetween, a chuck surrounding each bearing shell, means for mounting each bearing shell to tilt axially of the roll, a thrust collar mounted on one of the roll necks, stationary bearing members cooperating with said thrust collar, and means for supporting said stationary thrust-bearing members, said last-named means being independent of said means for tiltably mounting the associated bearing shell, whereby the thrust is transmitted to the associated chuck without interfering with the axial tilting of the associated bearing shell.

26. Radial oil-film bearings for the necks of a roll, each of said bearings comprising a bearing shell surrounding a neck and having a cylindrical bearing surface cooperating with a cylindrical surface on said neck to form an oil film therebetween, a chuck surrounding each bearing shell, means for mounting each bearing shell to tilt axially of the roll, a thrust collar mounted on one of the roll necks, stationary bearing members cooperating with said thrust collar, and a housing for said stationary thrust-bearing members spaced from the associated bearing shell and mounted on the associated chuck independently of said means for tiltably mounting the associated bearing shell whereby to transmit the thrust to said chuck without interfering with the tilting or expansion of said bearing shell.

27. Radial oil-film bearings for the necks of a roll, each of said bearings comprising a bearing shell surrounding the neck and having a cylindrical bearing surface cooperating with a cylindrical surface on said neck to form an oil film therebetween, a chuck surrounding each bearing shell, a thrust collar mounted on one of the roll necks, stationary bearing members cooperating with said thrust collar, and means for supporting said stationary thrust-bearing members from the associated chuck, said stationary thrust-bearing members cooperating with each face of the thrust collar and including a plurality of bearing shoes disposed symmetrically with respect to the axis about which said thrust collar is likely to tilt under the stresses existing thereon.

28. Radial oil-film bearings for the necks of a roll, each of said bearings comprising a bearing shell surrounding a neck and having a cylindrical bearing surface cooperating with a cylindrical surface on said neck to form an oil film therebetween, a chuck surrounding each bearing shell, a thrust collar mounted on one of the roll necks, stationary bearing members cooperating with said thrust collar, and means for supporting said stationary thrust bearing members from the associated chuck, said stationary thrust bearing members including a plurality of tiltable bearing shoes cooperating with each face of said thrust collar and being symmetrically arranged with respect to a transverse plane passing through the axis of the neck and normal to the resultant of the pressure acting on the radial bearing.

29. Radial oil-film bearings for the necks of a roll, each of said bearings comprising a bearing shell surrounding a neck and having a cylindrical bearing surface cooperating with a cylindrical surface on the neck to form an oil film therebetween, a chuck surrounding each bearing shell, a thrust collar mounted on one of the roll necks, stationary bearing shoes cooperating with said thrust collar, a housing supported on the associated chuck out of thrust-transmitting relation with said shell, and means for transmitting the thrust on said housing to said chuck.

30. Radial oil-film bearings for the necks of a roll, each of said bearings comprising a bearing shell surrounding a neck and having a cylindrical bearing surface cooperating with a cylindrical surface on said neck of the roll to form an oil film therebetween, and means for retaining oil in contact with said bearing surfaces including a member coacting with one of said bearing surfaces at only the relatively unloaded side of the bearing.

31. Radial oil-film bearings for the necks of a roll, each of said bearings comprising a bearing shell surrounding a neck and having a cylindrical bearing surface cooperating with a cylindrical surface on the neck to form an oil film therebetween, a chuck surrounding each bearing shell, means for mounting each bearing shell to tilt axially of the roll, a thrust collar mounted on one of the roll necks, stationary bearing members cooperating with said thrust collar, a housing for supporting said stationary thrust-bearing members, said housing being spaced from the associated bearing shell and supported on the associated chuck independently of said bearing shell for transmitting the thrust to the associated chuck without interfering with the axial tilting of the associated bearing shell, said housing including a chamber in which the thrust-receiving members are disposed and which is in communication with the bearing surfaces of the associated radial bearing, means at the opposite extremities of said thrust and radial bearings for retaining the oil in contact with the bearing surfaces thereof, and means for supplying oil to said bearing surfaces.

32. In a radial oil-film bearing for roll necks, a bearing shell surrounding the neck of a roll and having a cylindrical bearing surface cooperating with a cylindrical surface on the neck to form an oil film therebetween, a chuck surrounding the bearing shell, means for mounting the bearing shell to tilt axially of the roll, and means mounted on the chuck and spaced from but cooperating with the associated bearing shell to prevent displacement of said shell from its neck.

33. In a radial oil-film bearing for roll necks, a bearing shell surrounding the neck of a roll and having a cylindrical bearing surface cooperating with a cylindrical surface on the neck to form an oil film therebetween, a chuck surrounding each bearing shell, means for mounting each bearing shell to tilt axially of the roll, and means mounted on each chuck and spaced from but cooperating with the associated bearing shell to prevent displacement of said shell from its neck, said means including a housing mounted on the associated chuck and containing a chamber in communcation with the bearing surfaces of said radial bearing, means at the opposite extremities of said housing and radial bearing for retaining the oil in contact with the bearing surfaces thereof, and means for supplying oil to said bearing surfaces.

34. In a rolling mill, radial oil-film bearings for the necks at the opposite extremities of a roll, each of said oil-film bearings including a bearing shell surrounding the neck and having a cylindrical bearing surface cooperating with a cylindrical surface on the neck to form an oil film therebetween, a chuck surrounding each bearing shell, means for tiltably mounting each of said bearing shells to tilt axially with respect to the roll and relatively to its chuck to retain alinement of the bearing surfaces, and a thrust bearing associated with one of said radial bearings and adapted to sustain the thrust of said roll in both directions, said thrust bearing having a housing cooperating with the associated bearing shell to retain the same on its roll neck but without interfering with its tilting action.

35. In a rolling mill, radial oil-film bearings for the necks at the opposite extremities of a roll, each of said oil-film bearings including a bearing shell surrounding the neck and having a cylindrical bearing surface cooperating with a cylindrical surface on the neck to form an oil film therebetween, a chuck surrounding each bearing shell, means for tiltably mounting each of said bearing shells to tilt axially with respect to the roll and relatively to the chuck to retain alinement of the bearing surfaces, and means associated with each of said radial bearings and mounted independently thereof on the associated chuck for cooperating with the associated bearing shell to retain the same on its roll neck but without interfering with its tilting action.

36. In a rolling mill, radial oil-film bearings for the necks at the opposite extremities of a roll, each of said oil-film bearings including a bearing shell surrounding the neck and having a cylindrical bearing surface cooperating with a cylindrical surface on the neck to form an oil film therebetween, a chuck surrounding each bearing shell, a thrust bearing associated with the radial bearing on one neck of the roll and adapted to transmit the thrust pressures to the associated chuck, independently of the associated bearing shell, said thrust bearing including a housing carried by the associated chuck and spaced from but cooperating with the associated bearing shell to prevent displacement of said bearing shell from its neck, and means carried by the chuck on the other neck and spaced from but cooperating with the bearing shell thereof to prevent displacement of the last-mentioned bearing shell from its neck.

37. In a rolling mill, radial oil-film bearings for the necks at the opposite extremities of a roll, each of said oil-film bearings including a bearing shell surrounding the neck and having a cylindrical bearing surface cooperating with a cylindrical surface on the neck to form an oil film therebetween, a chuck surrounding each bearing shell, a thrust bearing associated with the radial bearing on one neck and adapted to transmit the thrust pressures to said chuck, said thrust bearing including a housing spaced from but cooperating with said bearing shell to prevent displacement of said bearing shell from its neck, retaining means carried by the chuck at the opposite end of the roll and spaced from but cooperating with the bearing shell thereof to prevent displacement of the corresponding bearing shell from its neck, means carried by each bearing shell for restraining flow of oil from said radial bearings inwardly with respect to said roll, and means carried by said thrust-bearing housing and said shell-retaining means respectively for restraining flow of oil outwardly with respect to said roll.

38. In a rolling mill, a roll having necks and housings for supporting said roll in operative position, a radial oil-film bearing cooperating with each neck of said roll, said roll and its bearings being movable as a unit into and out of said housings, and a disk mounted on the roll neck and adapted to fit into the socket of a hook for removing the roll, whereby the weight of said unit is sustained by said hook without application of stress to the elements of the radial bearing.

39. In a rolling mill, a roll having necks and housings for supporting said roll in operative position, a radial oil-film bearing cooperating with each neck of said roll, a chuck surrounding each bearing and adapted to retain the associated bearing in its mill housing, and a thrust bearing associated with one of said radial bearings for taking the thrust on said roll in both directions, said thrust bearing being mounted on the associated chuck independently of the associated shell and transmitting said thrust to the associated chuck independently of said shell, said radial bearings, said thrust bearing and said chucks being movable as a unit with the roll into and out of said frame and each being removable from the roll in sections.

40. In a rolling mill, a roll having necks and housings for supporting said roll in operative position, a radial oil-film bearing cooperating with each neck of said roll, and a chuck surrounding each radial bearing and adapted to retain the associated bearing in its mill housing, each of said bearings including a bearing shell and a chuck divisible upon a diametrical plane and surrounding said shell, said chucks and bearing shells being movable with said roll as a unit into and out of the housings and each chuck being removable from its bearing shell to permit retention of the bearing shells on the roll necks during storage or grinding of the roll.

41. In a rolling mill, a roll having necks and housings for supporting said roll in operative position, a radial oil-film bearing cooperating with each neck of said roll, each bearing including a bearing shell, a chuck surrounding said bearing shell and adapted to retain the same in its mill housing, said chuck being divisible on a diametrical plane, a member carried by said chuck and cooperating with said bearing shell to retain lubricant in contact with the bearing surface, said member being normally spaced from said bearing shell to permit movement of said bearing shell independently of said member under changes of temperature and deformation of the parts, and means for closing the gap between each shell and its associated member, said shells, members and chucks being movable as a unit with the roll into and out of the mill housings and said chucks being removable from said shells, leaving said shells and members on said necks in unitary relationship with said roll during storage or grinding of the latter.

42. In a rolling mill, spaced housings, a roll having necks supported therein, a radial oil-film bearing cooperating with each neck of said roll, a chuck surrounding each bearing and adapted to retain the associated bearing in its housing, said bearing shells and chucks being movable as a unit with said roll into and out of the housings, and conduits for leading oil to and from said bearing shells and including disconnectible connections adjacent the shells whereby the conduit ends adjacent said shells constitute a part of the unit movable with the roll, said chucks being divisible upon a diametrical plane and provided with recesses adapted to receive said conduit ends whereby the parts of said chucks may be removed from said shells without disturbing said conduit ends.

43. In a rolling mill, spaced housings, a roll having necks supported therein, a radial oil-film bearing cooperating with each neck of said roll, a chuck surrounding each bearing and adapted to retain the associated bearing in its housing, said bearing shells and chucks being movable as a unit with said roll into and out of the housings, conduits for leading oil to and from said bearing shells and including disconnectible connections adjacent the shells whereby the conduit ends adjacent said shells constitute a part of the unit movable with the roll, and connections for leading a cooling medium to and from said bearing shells and including readily disconnectible connections adjacent the bearing shells whereby the conduit ends adjacent said shells constitute a part of said unit, said chucks being divisible upon a diametrical plane and provided with recesses adapted to receive said conduit ends whereby the parts of said chucks may be removed from said shells without disturbing said conduit ends.

44. In a rolling mill, a roll having necks and housings for supporting said roll in operative position, a radial oil-film bearing cooperating with each neck of said roll, a chuck surrounding each bearing and adapted to retain the associated bearing in its housing, said bearing shells and chucks being movable as a unit with said roll in the direction of the axis of said roll into and out of said housings, radially movable means on one of the mill housings adapted to cooperate with the chuck on the end of the roll which on assembly enters the housings first and to interlock therewith to prevent axial movement thereof in either direction, and means cooperating with the chuck on the opposite end of the roll and adapted to engage the same and prevent outward movement of said chuck with respect to the housings.

45. In a rolling mill, a roll having necks and housings for supporting said roll in operative position, a radial oil-film bearing cooperating with each neck of said roll, a chuck surrounding each bearing and adapted to retain the associated bearing in its housing, said bearing shells and chucks being movable as a unit with said roll into and out of said housings, said chucks being divisible on a diametrical plane for access to said bearing shells and said bearing shells being divisible on a diametrical plane for access to the bearing surfaces thereof.

46. In a rolling mill, a roll having necks and housings for supporting said roll in operative position, a radial oil-film bearing cooperating with each neck of said roll, a chuck surrounding each bearing and adapted to retain the associated bearing in its housing, a thrust bearing, a housing enclosing said thrust bearing and associated with one of said bearing shells and supported on the associated chuck, said bearing shells, chucks and associated thrust-bearing elements being movable as a unit with said roll into and out of said housings, said chucks being divisible on a diametrical plane for access to said bearing shells, said bearing shells being divisible on a diametrical plane for access to the radial-bearing surfaces, and said thrust-bearing housing being divisible for access to said thrust-bearing elements.

47. In a radial oil-film bearing for a roll neck, a chuck for mounting said bearing in a mill housing, a bearing shell cooperating with a cylindrical surface on the roll neck to form an oil film therebetween and means for mounting said bearing shell to tilt axially with respect to the chuck and maintain alinement of the bearing surfaces, said means including a block mounted in an aperture of the associated chuck and removable therewith, said block having means for supporting the bearing shell and means projecting outside of the chuck for tiltably engaging an abutment on the mill housing.

48. In a radial oil-film bearing for a roll neck, a chuck for mounting said bearing in a mill housing, a bearing shell cooperating with a cylindrical surface on the roll neck to form an oil film therebetween, and means for mounting said bearing shell to tilt axially with respect to the chuck and maintain alinement of the bearing surface, said last-named means including a block mounted in an aperture in said chuck and having means projecting beyond said chuck for tiltable engagement with an abutment on the mill housing, said block at its inner end having distributed surfaces of engagement with said bearing shell and interlocking relationship therewith to prevent other than tilting movement thereof.

49. In a rolling mill, rolls having necks thereon, radial oil-film bearings for the necks of the rolls, each of said bearings including a bearing shell cooperating with a roll neck to provide cylindrical bearing surfaces therebetween, and separate gravity and pressure oil-feed systems for supplying said bearing surfaces with lubricant whereby predetermined oil films may be maintained between said bearing surfaces.

50. In a rolling mill, a roll having necks thereon, radial oil-film bearings for the necks of the roll, said roll having a neck shaped at the end to fit into the socket of a hook for removing the roll, and a disk mounted on said roll neck intermediate the end thereof and the radial-bearing surface thereon and adapted to fit into a portion of said hook socket of different diameter from that receiving the end of the neck, whereby said roll on removal is supported from said hook at spaced portions of said neck.

51. In a rolling mill, a roll having necks supported in spaced housings, a radial oil-film bearing cooperating with each neck of said roll, said bearings being movable into and out of the mill housings as a unit with said roll individually and each bearing including a shell divisible on a horzontal diametrical plane whereby either half of the radial bearing shell may be removed from the roll neck independently of the other.

52. In a rolling mill, a roll having necks supported in spaced housings, a radial oil-film bearing cooperating with each neck of said roll, and a thrust bearing associated with one of said radial bearings and provided with a divisible housing, said radial bearings and said thrust bearing being movable as a unit with said roll into and out of the mill housings and each of said radial bearings including a shell divisible on a horizontal diametrical plane, said thrust bearing housing and said shell halves being each removable from the roll neck independently of the other.

53. In a rolling mill, a radial oil-film bearing for the rolls comprising a bearing shell surrounding the neck of a roll and having a cylindrical bearing surface cooperating with a cylindrical surface on the neck to form an oil film therebetween, a thrust bearing associated with said radial bearing and having a housing enclosing the bearing members thereof, said shell and said housing being normally spaced to permit relative movement therebetween and said shell and housing being removable as a unit with said roll, and means to close the gap between said shell and housing to prevent ingress of foreign matter thereto when said unit is removed from the mill housing.

54. In a rolling mill, spaced housings and a roll supported therein, a radial oil-film bearing for a roll neck comprising a bearing shell surrounding the neck and having a cylindrical bearing surface cooperating with a cylindrical surface on the neck to form an oil film therebetween, a chuck surrounding said shell and adapted to retain the same in the housing, said shell and said chuck having arcuate engaging surfaces for that portion of the circumference of the shell toward which the resultant of pressure during rolling is acting and being out of contact for the remainder of the circumference of said shell, and said shell being axially slidable into said chuck on said arcuate surfaces, and means for locking said shell in said chuck against relative displacement but permitting axial movement of said shell into and out of said chuck.

55. In a radial oil-film bearing for a roll neck, a bearing shell surrounding the neck and having a cylindrical bearing surface cooperating with a cylindrical surface on the neck to form an oil film therebetween, an oil-retaining ring cooperating with a surface on the roll neck and adapted to confine oil between said bearing surfaces, and an arcuate oil-retaining ring cooperating with the bearing surface on the roll neck at the unloaded side thereof and axially inside of said first-named oil-retaining ring to minimize leakage from the bearing surfaces where the clearance is large without diminishing the bearing surface where the load is applied.

56. In a radial oil-film bearing for roll necks, a bearing shell completely surrounding the neck of a roll and having a cylindrical bearing surface cooperating with a cylindrical surface on the neck of the roll to form an oil film therebetween, and relatively rotatable means clamped against a shoulder on said roll and disposed between said shell and shoulder for excluding dirt and water, said means including a pair of relatively rotatable rings and a pair of sealing rings carried thereby and engaging sealing surfaces on the opposed ring.

57. In a radial oil-film bearing for roll necks, a bearing shell completely surrounding a neck and having a cylindrical bearing surface cooperating with a cylindrical surface on the neck to form an oil film therebetween, a chuck in which said bearing shell is mounted, and means interlocking said shell in said chuck but providing a pivotal support for said shell in said chuck whereby it may tilt axially with respect thereto and maintain alinement of the bearing surfaces under deformation of the roll or its neck.

58. In a bearing for roll necks, a sleeve mounted on a roll neck and provided with passages for the circulation of water therethrough and a bearing shell surrounding said sleeve and having a cylindrical bearing surface cooperating with the surface of said sleeve to form an oil film therebetween, said sleeve being free to creep circumferentially with respect to said neck, and connections for leading water to and from said passages in said sleeve.

59. In a bearing for roll necks, a sleeve mounted on a roll neck and provided with passages for the circulation of water therethrough and a bearing shell surrounding said sleeve and having a cylindrical bearing surface cooperating with the surface of said sleeve to form an oil film therebetween, connections for leading water to and from said passages in said sleeve, and means for automatically controlling the temperature maintained at said sleeve.

60. In a bearing for roll necks, a sleeve mounted on a roll neck and provided with passages for the circulation of water therethrough and a bearing shell surrounding said sleeve and having a cylindrical bearing surface cooperating with the surface of said sleeve to form an oil film therebetween, a member rotatable with said sleeve and providing inlet and outlet passages for the passages in said sleeve, and relatively stationary connections for supplying and withdrawing cooling water to and from said member.

61. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, said shell and chuck having fitted surfaces of engagement for a portion only of the circumference of said shell and the remainder of said shell having a substantial clearance from said chuck to allow for expansion, and means for fixedly securing said shell and chuck together at said fitted surfaces of engagement.

62. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, said shell and chuck having fitted surfaces of engagement for a portion only of the circumference of said shell and the remainder of said shell having a substantial clearance from said chuck to allow for expansion, and means for fixedly securing said shell and chuck together at said fitted surfaces of engagement, said last-named means including axially extending shoulders on said shell and members provided with axially extending surfaces engaging said shoulders and fixedly secured to said chuck.

63. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, said shell and chuck having fitted surfaces of engagement for a portion only of the circumference of said shell and the remainder of said shell having a substantial clearance from said chuck to allow for expansion, and means for fixedly securing said shell and chuck together at said fitted surfaces of engagement, said last-named means including an axially extending shoulder on said shell, a ring having an axially extending surface engaging said shoulder, and means fixed to said chuck and retaining said ring in concentric relation with respect to said shoulder;

64. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, said shell and chuck having fitted surfaces of engagement for a portion only of the circumference of said shell and the remainder of said shell having a substantial clearance from said chuck to allow for expansion, and means for fixedly securing said shell and chuck together at said fitted surfaces of engagement, said last-named means including axially extending shoulders on said shell, annular members having axially extending surfaces engaged with said shoulders, and rings secured to said chuck and cooperating with said annular members for retaining the same in clamping engagement with said shoulders on said shell.

65. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, said shell and chuck having fitted surfaces of engagement for a portion only of the circumference of said shell and the remainder of said shell having a substantial clearance from said chuck to allow for expansion, and means for fixedly securing said shell and chuck together at said fitted surfaces of engagement, said last-named means including an axially extending shoulder at the outer end of said bearing shell, a housing ring having an axially extending surface in engagement with said shoulder, and a ring attached to said chuck and having a close fit with the periphery of said housing ring for retaining said housing ring in clamping engagement with said shoulder, said rings having axially narrow closely fitted surfaces and said chuck, shell and rings having otherwise loosely fitted surfaces whereby said chuck may be readily removed axially over said shell.

66. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, and means for retaining lubricant in contact with said cylindrical bearing surfaces including a member surrounding the roll neck adjacent the end of the bearing shell at the relatively non-loaded side thereof and provided with an arcuate oil-retaining member making rubbing contact with the cylindrical surface on the roll neck at only the relatively non-loaded side thereof.

67. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, and means for retaining oil in contact with said cylindrical bearing surfaces including oil-retaining members making contact with said cylindrical surface on the roll neck adjacent opposite extremities thereof and over an arc of said cylindrical surface at only the relatively non-loaded side of the radial bearing.

68. In a radial oil-film bearing for roll necks, a bearing shell surrounding the neck of a roll and having a cylindrical bearing surface cooperating with a cylindrical surface on the neck to form an oil film therebetween, a chuck surrounding said bearing shell, and means for retaining lubricant in contact with said cylindrical bearing surfaces including an arcuate oil-retaining member disposed adjacent the end of the cylindrical bearing surfaces and contacting with said cylindrical surface on the roll neck at only the relatively unloaded side of said bearing for at least a semi-circumference thereof.

69. In a bearing for a roll having a working portion and a roll neck projecting therefrom, a sleeve mounted on a roll neck and providing a cylindrical bearing surface at its outer periphery, a bearing shell cooperating with said bearing surface, and means clamped between said sleeve and the working portion of the roll for preventing ingress of dirt and water.

70. In a bearing for roll necks, a sleeve mounted on a roll neck and providing a cylindrical bearing surface at its outer periphery, a bearing shell cooperating with said bearing surface, a ring interposed between said sleeve and the body of the roll for preventing ingress of dirt and water, a stationary ring surrounding said first-mentioned ring and provided with an oil-retaining ring in contact with said first-mentioned ring for preventing escape of oil.

71. In a bearing for roll necks, a sleeve mounted on a roll neck and providing a cylindrical bearing surface at its outer periphery, a bearing shell cooperating with said bearing surface, and means interposed between said sleeve and the body of the roll for preventing ingress of dirt and water, said means including a ring having a portion clamped between said sleeve and the body of the roll and a portion making a fluid-tight contact with the end of the roll, said ring being under a normal tension whereby movement of the sleeve with respect to the roll does not interrupt the engagement of said ring with said sleeve and the end of the roll.

72. In a bearing for roll necks, said bearing including a cylindrical bearing surface and a bearing shell cooperating with said bearing surface, a ring rotating with the roll, and a relatively stationary ring adjacent to said first-named ring, said rings being provided with relatively rotatable oil-retaining members contacting at cylindrical surfaces and having resilient contact at radial surfaces whereby relative axial movement may take place between said rings without interrupting the oil-retaining contact of said relatively rotatable members.

73. In a rolling mill, a roll having necks thereon, a radial oil-film bearing cooperating with each neck of said roll and including a bearing shell and means interposed between the shell and roll to exclude dirt and water from the bearing surfaces, said means including a resilient ring clamped on the roll neck and stressed into sealing contact with a shoulder on the roll and means cooperating therewith and associated with said shell.

74. In a rolling mill, a roll having necks thereon, a radial oil-film bearing cooperating with each neck of said roll and including a sleeve on the roll neck and a bearing shell cooperating with said sleeve, and a resilient ring clamped between said sleeve and a shoulder on the roll neck and flexed thereby into sealing contact with said shoulder whereby said sealing contact is maintained if said sleeve yields axially.

75. A rolling mill roll having a neck provided with cylindrical surfaces of different diameters and adapted to cooperate with means providing radial oil-film bearings for the neck, and a sleeve adapted to be mounted on the roll neck and secured to the roll, said sleeve having portions of different diameters corresponding to those of the neck and forming a protecting enclosure for said cylindrical portions of the roll neck, said sleeve cooperating with the surfaces of the roll to prevent ingress of foreign matter to the bearing surface thereof.

76. In a rolling mill, a roll, a radial oil-film bearing for each roll neck including a bearing shell, a chuck in which said shell is mounted, a ring associated with said shell for retaining said shell on said neck and a split ring mounted on said chuck and interlocking with said first-named ring to prevent relative separation of said parts.

77. In a rolling mill, a roll, a radial oil-film bearing for each roll neck including a bearing shell, a chuck in which said shell is mounted, a thrust bearing including a housing, said thrust bearing cooperating with said shell to retain the same on said neck, and a split ring mounted on said chuck and interlocking with said housing to prevent relative separation of said parts.

78. In a bearing for roll necks, a cylindrical bearing surface and a bearing shell cooperating with said bearing surface, a ring rotating with the roll and a relatively stationary ring associated with said shell, said rings being provided with relatively rotatable oil-retaining means contacting at a plurality of surfaces and permitting relative movement to take place between said rings without interrupting the oil-retaining contact thereof.

79. In a bearing for roll necks, a cylindrical bearing surface and a bearing shell cooperating with said bearing surface, relatively rotatable rings mounted on said roll neck and associated with said shell respectively, at least one of said rings being resilient and stressed into contact with an opposed surface on said roll, and relatively rotatable oil-retaining means interposed between said rings and having contact at cylindrical surfaces whereby said contact is maintained upon relative movement between said roll and shell.

80. In a bearing for roll necks, a cylindrical bearing surface and a bearing shell cooperating with said bearing surface, a ring rotating with the roll, and a relatively stationary ring adjacent to said first-named ring, said rings being provided with relatively rotatable oil-retaining means contacting opposed surfaces whereby relative axial movement may take place between said rings without interrupting the oil-retaining contact of said relatively rotatable members.

81. In a bearing for roll necks, a sleeve mounted on the roll neck and providing a cylindrical bearing surface at its outer periphery, a bearing shell cooperating with said bearing surface, and means interposed between said sleeve and the body of the roll for preventing ingress of dirt and water, said means including a ring clamped between said sleeve and the body of the roll and making a fluid-tight contact with the end of the roll, said ring being under a normal tension whereby movement of the sleeve with respect to the roll does not interrupt the engagement of said ring with said sleeve and the end of the roll, and a relatively stationary ring adjacent to said first-named ring, said rings being provided with relatively rotatable oil-retaining means.

82. In a bearing for roll necks, a cylindrical bearing surface and a bearing shell cooperating therewith, means for excluding dirt and water from the bearing surfaces at the inner end of said shell, said means including a resilient ring of angular cross section clamped against a shoulder on said roll and flexed by said clamping engagement to retain said ring against said shoulder.

83. In a bearing for roll necks, a cylindrical bearing surface and a bearing shell cooperating therewith, means for excluding dirt and water from the bearing surfaces at the inner end of said shell including a resilient ring of angular cross section clamped against a shoulder on said roll and flexed by said clamping engagement to retain said ring against said shoulder, and a relatively stationary ring adjacent said first-named ring, said rings being provided with an oil-retaining member on one engaging an opposed surface on the other.

ALBERT KINGSBURY.
HARRY A. S. HOWARTH.

CERTIFICATE OF CORRECTION.

Patent No. 2,243,009. May 20, 1941.

ALBERT KINGSBURY, ET AL.

It is hereby certified that error appears in the printed specification of the above numbered patent requiring correction as follows: Page 8, second column, line 7, for the word "marking" read --working--; and that the said Letters Patent should be read with this correction therein that the same may conform to the record of the case in the Patent Office.

Signed and sealed this 17th day of June, A. D. 1941.

(Seal)

Henry Van Arsdale,
Acting Commissioner of Patents.